(12) United States Patent
Ricketts et al.

(10) Patent No.: US 7,993,187 B2
(45) Date of Patent: Aug. 9, 2011

(54) FOREIGN OBJECT DETECTION AND REMOVAL SYSTEM FOR A COMBINE HARVESTER

(75) Inventors: Jonathan E. Ricketts, Ephrata, PA (US); Herb M. Farley, Elizabethtown, PA (US); Bradley J. Wagner, Orrtanna, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/611,527

(22) Filed: Nov. 3, 2009

(65) Prior Publication Data

US 2010/0048269 A1 Feb. 25, 2010

Related U.S. Application Data

(63) Continuation-in-part of application No. 12/154,604, filed on May 23, 2008.

(60) Provisional application No. 60/931,418, filed on May 23, 2007.

(51) Int. Cl.
*A01D 75/18* (2006.01)
(52) U.S. Cl. .......................................... 460/2; 56/10.2 J
(58) Field of Classification Search .................. 460/1–3; 56/10.4, 10.2 R, 10.2 J
See application file for complete search history.

(56) References Cited

U.S. PATENT DOCUMENTS

| | | |
|---|---|---|
| 3,675,660 A | 7/1972 | Girodat |
| 4,275,546 A | 6/1981 | Bohman et al. |
| 4,288,969 A | 9/1981 | Underhill |
| 4,294,062 A | 10/1981 | Seymour |
| 4,305,244 A | 12/1981 | Seymour et al. |
| 4,322,933 A | 4/1982 | Seymour |
| 4,332,262 A | 6/1982 | De Busscher |
| 4,343,137 A | 8/1982 | Seymour |
| 4,353,199 A | 10/1982 | Chow et al. |
| 4,355,565 A | 10/1982 | Bianchetta |
| 4,522,553 A | 6/1985 | Nelson et al. |
| 4,720,962 A | 1/1988 | Klinner |
| 4,768,525 A | 9/1988 | Tanis |
| 4,800,711 A | 1/1989 | Hurlburt et al. |
| 4,846,198 A | 7/1989 | Carnewal et al. |
| 4,866,920 A | 9/1989 | Kerckhove et al. |
| 4,907,402 A | 3/1990 | Pakosh |
| 4,967,544 A | 11/1990 | Ziegler et al. |
| 5,155,984 A | 10/1992 | Sheehan |
| 5,702,300 A | 12/1997 | Wilson |
| 5,769,711 A | 6/1998 | Roberg |
| 5,833,533 A | 11/1998 | Roberg |
| 5,928,079 A | 7/1999 | Roberg |
| 5,974,776 A | 11/1999 | Prellwitz |
| 6,152,820 A | 11/2000 | Heidjann et al. |
| 6,298,641 B1 | 10/2001 | Digman et al. |
| 6,381,932 B1 * | 5/2002 | Clauss ........................ 56/10.2 J |
| 6,912,835 B1 | 7/2005 | Chabassier |
| 7,022,012 B2 | 4/2006 | Heinsey et al. |

(Continued)

*Primary Examiner* — Thomas B Will
*Assistant Examiner* — Mai Nguyen
(74) *Attorney, Agent, or Firm* — Michael G. Harms; Patrick M. Sheldrake

(57) ABSTRACT

A foreign object detection and removal system for an agricultural combine is provided. The system includes a controller operatively connected to a feederhouse and a chopper assembly. The feederhouse includes an acoustic element for detecting foreign objects and an actuator for opening and closing a door of the feederhouse to remove foreign objection. The chopper assembly includes an actuator to retract a knife bank to allow for the passage of foreign objects through the chopper assembly without causing damage to the chopper assembly.

13 Claims, 28 Drawing Sheets

U.S. PATENT DOCUMENTS

| | | |
|---|---|---|
| 7,207,165 B2 | 4/2007 | Crego et al. |
| 7,510,472 B1 | 3/2009 | Farley et al. |
| 7,520,111 B2 | 4/2009 | Berger et al. |

| | | | |
|---|---|---|---|
| 2006/0277883 A1* | 12/2006 | Berger et al. | 56/10.2 J |
| 2007/0004479 A1 | 1/2007 | Dow et al. | |
| 2008/0293462 A1 | 11/2008 | Farley et al. | |

* cited by examiner

FOREIGN OBJECT DETECTION AND REMOVAL SYSTEM FOR A COMBINE HARVESTER

CROSS-REFERENCE TO RELATED APPLICATIONS

This application is a Continuation-in-Part of co-pending U.S. patent application Ser. No. 12/154,604, filed May 23, 2008 which claims the benefit of U.S. Provisional Application No. 60/931,418, filed May 23, 2007, the disclosures of each of which are hereby incorporated by reference herein in their entireties.

BACKGROUND OF THE INVENTION

1. Technical Field

This invention relates generally to agricultural harvesting combines and machines and to straw and residue chopping systems therewith, and more particularly to improvements in the concave pan portion of an integral chopper assembly, but most specifically to the provision of a replaceable grate portion of the counter knife assembly and an interruption plate downstream from the slots in the grate portion. The present invention further relates to a foreign object detection and removal system that provides a system that includes a means for retracting the counter knife assembly from the integral chopper assembly for the removal of foreign objects from the internal workings of the combine.

2. Background Art

In the operation of a typical agricultural combine that employs a threshing rotor, the flow of crop residue, sometimes referred to as material other than grain (MOG), remaining after threshing is typically discharged into a crop residue treatment and distribution system for treatment thereby and for ultimate distribution onto or over a field. Straw and residue chopper assemblies and residue spreader assemblies of various types and constructions have long been in use in or with such residue treatment and distribution systems. Such assemblies have operated to chop or pulverize the crop residue resulting from a harvesting operation into finer pieces and/or to spread the resulting crop residue, whether chopped into finer pieces by operation of a chopper assembly or passed to the spreader assembly as larger pieces of residue, onto and over the field. While such chopper and residue spreader assemblies have taken various forms, depending upon the desires of users and manufacturers, they may sometimes be identified as being of certain general types.

Many typical harvesters have traditionally employed technology and methods that have become associated with what is sometimes referred to as a hood mount chopper. Generally, such hood mount choppers can be described as flail choppers, and the systems of which they are a part have evolved to the point that they may include over 100 flail knives on a rotating chopper, mounted within a dedicated housing that provides an appropriate environment for the operation of the rotating chopper so as to best maximize its performance. The rotating chopper of such a residue management system may often operate at or above 3000 RPM and provide suitable and sufficient energy to the chopped material to be able to effect a spread of the chopped material over a width of up to 40 feet, which width generally corresponds to the cut width of the header. Such a residue management system is thus operable for its intended purpose of chopping and spreading the chopped material over a field, and generally operates effectively in such regard. With such a system, if a user does not desire to chop the straw, he may turn the chopper off and bypass, or route the material flow around, the chopper.

Typical Case IH harvesters, however, have, for over 25 years now, in an effort to provide greater equipment versatility while reducing equipment complexities, typically employed a somewhat different technology in the residue management systems thereof. Such alternative technology, the primary purpose of which has been the transport of material away from the threshing system, has utilized a multifaceted construction that affords greater versatility in the transport of such material in that such material can not only be transported, but can also be treated in varying manners dependent upon the desires of operators. Such constructions have come to be known as integral choppers or integral chopper or chopping systems due to the integration of a chopping function, in addition to the primary transport function, into the combine and its operations. Such integral chopper systems, because of their positioning within the combine and their functional capabilities, offer a versatility not generally available with the hood mounted chopper systems.

Such integral chopper systems have been so designed that, as noted hereinabove, their primary function is the transport of material away from the threshing system and a secondary function is the treatment of such material as it is being so transported. Such operations are usually effected in one of two different ways. Most commonly, the integral chopper system is operated to transport the material from the threshing system to a spreading system as a rotary chopper element or portion rotates at or near 3000 RPM so as to quickly move the material rearwardly and to also chop it into smaller pieces as it is being so transported. Less commonly, the integral chopper system is operated to more gently transport the material from the threshing system to a spreading system as the rotary chopper element operates at a much slower speed, typically at only about 800 RPM, with considerably less chopping activity. In the former instance, the desire and expectation is that the material will be transported and that the shortest mean length of cut will be realized to allow for modem minimum tillage applications while the chopping is accomplished using as little power as possible. In the latter instance, the desire and expectation is that the material will be transported in such a manner as to provide the longest and least damaged straw possible.

With reference to such integral chopper systems, the more recent integral chopper systems have typically included a residue chopper assembly that has a rotary chopper component or element disposed laterally within a housing extending generally horizontally across the flow path of the crop residue through the housing, as well as a counter knife assembly extending generally parallel to and spaced from the rotary chopper element. The counter knife assembly has included a chopper grate assembly spaced below and extending generally parallel to the rotary chopper element and a knife mounting assembly positioned generally beneath the chopper grate assembly.

The rotary chopper element of the residue chopper assembly has typically included a cylindrical tube or like member having a plurality of mounting locations distributed about its periphery, at which locations various knife blades or paddles have been mounted or affixed. Oftentimes the mounting locations and the knife blades connected or mounted thereat have been disposed in rows and columns, though sometimes in differing array configurations, about the outer surface of the rotary member so that, as the rotary member has been operated, the knife blades have served to contact and pull and push rearwardly the residue material passing near the rotary member, sometimes also cutting such residue material into smaller pieces as the residue material has been propelled rearwardly.

The chopper grate assemblies of the counter knife assemblies of such integral chopper assemblies have typically included a grate portion, often welded in place as part of the chopper grate assembly, having a plurality of holes or transverse slots spaced along its length, which holes or transverse slots have typically been so sized that smaller pieces of crop residue, which may include un-separated grain, have been able to pass therethrough and enter the combine cleaning system, at least when such holes or slots have not had other elements positioned therein or extending therethrough or have not otherwise been obstructed.

The knife mounting assemblies of such counter knife assemblies have typically included bar-like elements or components, positioned generally below the chopper grate assembly, extending in a fixed end-to-end arrangement with a plurality of spaced blade elements, often welded in place along the portion of the bar-like element generally facing the rotary chopper element, which blade elements have been aligned with slots in the grate portion of the chopper grate assembly. Such blade elements and slots in the grate portion of the chopper grate assembly have been coordinately sized and configured to permit the blade elements to be insertable into the slots to at least partially project therethrough when the knife mounting assembly is disposed in certain positions.

Often, the counter knife assemblies have had associated therewith an adjustment mechanism that has been operable to vary the spacing between the grate portion of the chopper grate assembly and the knife mounting assembly, as well as the degree of projection of the blade elements of the knife mounting assembly through the slots of the grate portion, as may have been desirable depending upon the crop being harvested. Such an adjustment mechanism has operated to move the knife mounting assembly between a fully engaged position with the blade elements of the knife mounting assembly extending through the slots towards the rotary chopper element and a fully retracted position in which the blade elements are fully withdrawn or retracted from the slots, and has typically also been operable to adjustably vary the position between a fully engaged and fully retracted position.

A counter knife assembly of such general construction, whether or not the knife mounting assembly thereof has had the capability of being adjustably repositionable relative to the grate portion by an adjustment mechanism, has often been referred to as a stationary knife assembly. Such nomenclature has been considered appropriate since such knife mounting assemblies, though perhaps adjustable to some extent to vary the distance between the rotary chopper element and the knife mounting assembly, such as by movement of the knife mounting assembly relative to the grate portion of the chopper grate assembly and the slots thereof, often in an arc-like movement about an offset axis parallel to both the rotary chopper element and the longitudinal axis of the knife assembly mounting, remain in essentially fixed or stationary positions during the chopping operation of the residue chopper assembly once they have been adjustably moved to a given position.

With such constructions, the knife blades or paddles of the rotary chopper element have cooperated with the blade elements of the knife mounting assembly when the knife mounting assembly has been positioned such that the blade elements thereof projected through the slots in the grate portion of the chopper grate assembly to both propel the residue rearwardly and to better chop the residue as it passed between the rotary chopper element and the chopper grate assembly.

Thus, in the operation of a typical combine that employs an integral chopper system, the flow of crop residue after threshing is typically discharged into a crop residue treatment and distribution system located below and rearwardly of the rear end of the threshing system, which crop residue treatment and distribution system includes the integral chopper system and its primary rotary chopper or beater apparatus or assembly that is operable to chop or beat the residue into smaller pieces as it transports and/or propels the resultant crop residue further rearwardly within a rear end of the combine for either discharge from the combine through a rear opening onto a field, or into another secondary chopper and/or spreader mounted on the rear end operable for spreading the residue over a swath of a field.

During a typical operation of such a combine, as the crop residue is discharged from the combine rotor and moves through the crop residue treatment and distribution system, it flows between the rotary chopper element of the integral chopper assembly and the chopper grate assembly thereof. When the stationary knife assembly is in an engaged position, as the crop residue is being moved and propelled rearwardly, such crop residue is also chopped into smaller pieces by the cooperative actions of the knife blades or elements of the stationary knife assembly and the knife blades or paddles on the rotating rotary chopper element. The rotational movement of the rotary chopper element, typically at or near 3000 RPM, thus serves not only to propel the resultant flow of crop residue further rearwardly, but also to effect a cutting of the material encountered by the knife blades or paddles associated therewith.

When the stationary knife assembly is positioned to a fully retracted position, however, such as might be desirable with some crops and/or for some residue, the crop residue passing between the rotary chopper element and the chopper grate assembly is moved rearwardly by the action of the rotary chopper element, but with greatly lessened chopping activity. If the rotary chopper element is rotated at a substantially lower speed, such as about 800 RPM, longer pieces of residue, with considerably less damage thereto, can be effectively transported rearwardly.

In general, it has been found that such dual and alternative transport operations of the integral chopper systems can best be realized by employing knife elements fixedly or rigidly mounted to or on the rotary member, as opposed to flail-type elements that could be mounted to lugs on the rotary member so as to be free to rotate about such lug connections, and by the use of blade elements that have a sharpened edge to efficiently and effectively cut or chop the residue, as opposed to blunt bars for beating or pulverizing such residue, as the residue passes between the rotary chopper element and the chopper grate assembly.

Such integral chopper systems, which are based upon a legacy design utilized by Case IH harvesters for approximately 25 years, have recognized advantages over hood mounted chopper systems in that they often allow combines to be manufactured with simpler designs and fewer moving parts, resulting in less expensive base units and lighter weight products, while typically performing at levels competitive to performance standards of hood mounted choppers. Despite the recognized versatility and advantages of the integral chopper systems, users have continued to seek improved systems, and have continued to present their desires and critiques of the prior art systems.

In such regard, users have continued to state their desires for an integral chopper system that can better absorb impacts with foreign objects without significant damage or breakage. In light thereof, and to address various European marketing demands, attempts have been made in more recent years to develop new types of integral chopper systems, including integral chopper systems that could utilize flail-type elements and connectors instead of fixed and rigidly mounted knife blades on the rotary element. In general, such integral chopper systems have met with limited success, due in part to difficulties in dealing with the increase in material throughput that has been experienced over the past 10 years as machine capacities, and consequent demands upon the integral position, have increased.

More particularly, at least with respect to flail-type integral chopper systems, it has proven difficult to achieve a system that can, to the desired degrees, effectively offer and provide the dual capabilities of, in one alternative, chopping into or reducing the residue to finer pieces for spreading as such residue is transported rearwardly and, in the other alternative, more gently transporting the residue, in larger pieces, rearwardly for windrowing. The use of flail-type elements and mountings in lieu of fixed and rigidly mounted knife blades on the rotary element has generally not resulted in the degree of success and satisfaction desired therefor, especially when such an integral chopper system has been operated as an 800 RPM flail chopper. In such operation, the flail-type elements, due to the lack of inertia associated therewith, have sometimes, even in the absence of heavy loading, folded back along their direction of travel and caused plugging of the harvester and consequent reliability problems. Such factor has been seen as a significant limitation to, and disadvantage of, a flail-type integral chopper as opposed to a fixed blade integral chopper.

On the other hand, such flail-type integral choppers offered one significant advantage over fixed blade integral choppers in that they could, unlike fixed blade integral choppers, better absorb energy when foreign objects, such as auger fingers or rocks, were encountered within the crop residue flow during operations. Often, with a fixed blade integral chopper, an impact with such a foreign object, especially if relatively severe, would effect mission disabling damage to a fixed blade integral chopper system, such as by cracking or breaking either or both the rotating knife blades or the stationary counter knife elements, or even snapping off the knife blade or element or breaking off its mounting, resulting in missing knife blade components and denigrating the performance of the assembly. With the flail-type integral choppers, however, the rotating flail-type elements could fold back if and when a foreign object became captured by the stationary knife elements, thereby significantly minimizing the possibility of damage to or breakage of the stationary knife elements or the rotating flail-type elements.

In addition, users have noted that, typically, the concave pan portion of the chopper grate assembly of the prior art integral chopper systems was so constructed, as by the welding of various components together, to be a major component of the integral chopper systems along and past which the residue would flow as it passed between the rotary element and the chopper grate assembly. Frequently, the wear experienced along the concave pan portion has been non-uniform, with the grate portion exhibiting the greatest wear, and with the concave pan portion therefore requiring replacement as a large component whenever the wear on the grate portion became undesirable. Such replacement of the concave pan portion, because of the size of such major component, has been cumbersome and more difficult than might otherwise have been desirable, especially when the remainder of the concave pan portion, other than the grate portion, remained generally serviceable.

Also, some users have expressed beliefs that the chop quality realizable by integral chopper systems, at least in length of cut (LOC), has remained inferior to the chop quality that could be realized by hood mounted choppers.

Consequently, attempts to develop improved integral chopper systems have continued. The ongoing challenge has been to develop an integral chopper assembly that can offer the various advantages desired while overcoming or minimizing the disadvantages that have been encountered with the prior art systems. The integral chopper system, as discussed and described hereinafter, is a newly developed system that employs various inventive concepts to realize in great part the various advantages sought therefor while overcoming and/or minimizing many of the difficulties and disadvantages associated with the prior art constructions.

Combine harvesters are also equipped with a feederhouse that lifts the cut crop into the threshing and separation areas of the combine. The grain is separated from the stalk by a rotor or threshing system. The grain is then moved and stored in a grain tank. The chaff and trash are deposited from the rear of the combine. The grain stored in the grain tank is eventually discharged through a grain tank unload tube. An operator usually runs these various operations from a glass-enclosed cab. Typically, the cab is located above and behind the header and feederhouse. There are a variety of agricultural combine harvesters and their operations are well known in the art. For examples of such harvesters reference U.S. Pat. No. 4,846,198 which illustrates the conventional and twin rotor threshing and separating systems of a harvester as well as other major systems of the harvester. See also the New Holland Super Conventional Combines TX™66, TX™68, the New Holland TWIN ROTOR® combines TR™ 89 and TR® 99 for examples of existing conventional and twin rotor harvesters. U.S. Pat. No. 4,332,262 also illustrates the primary systems of a conventional harvester. For further details regarding various agricultural harvester systems review U.S. Pat. Nos. 4,522,553, 4,800,711, 4,866,920, 4,907,402, 4,967,544 and 5,155,984. See also the New Holland corn head model 996 and the New Holland grain belt header model 994 for details regarding headers.

The previously mentioned feederhouse typically consists of a conveying chain which pushes the cut crop from the header to the front of the threshing system. The conveying chain has several crosspieces to assist in moving the crop and to ensure proper spacing. The conveying chain is powered and also positioned by a front drum and a rear drum. The front drum is positioned approximately behind the header and the rear drum is positioned approximately in front of the threshing system. As seen in FIG. 1, the drums rotate in a counter-clockwise fashion. The cut crop flow or crop mat is pushed by conveyor chain upwards along the floor of the feederhouse and towards the threshing system. Besides lifting or elevating the cut crop to the threshing and separating systems, the feederhouse provides several other functions. First, the feederhouse helps to properly position the header relative to the ground. Second, the feederhouse can be the location of a stone detection and removal means. Frequently, during farming operations, the header will inadvertently receive a stone. If the stone enters the threshing system in the combine, expensive damage will result to the threshing components. It is a critical function of a stone detection and removal system to prevent a stone from damaging the threshing system. A typical stone detection and removal system is a cylindrical stone beater or stone roll positioned near the mid-point of the feederhouse. The stone roll rotates allowing the crop mat to continue towards the rear drum and threshing system. A stone that is too large is forced from the feederhouse through a stone trap door beneath the stone roll. In addition to stones, the detection and removal system can generally function to remove any foreign object of sufficient bulk.

Unfortunately there are several deficiencies to the current feederhouse design. The stone beater design limits the thickness of the crop flow. By limiting the amount of crop flow, it takes longer to perform farming operations. Previously, acoustic instruments have been used to detect stones entering farm equipment. Typically, the stone contacts a sounding plate. The acoustic instrument monitors the sounding plate. A stone contacting the sounding plate causes the sounding plate to emit a sound above a predetermined setting. The acoustic instrument observes this sound and halts the farming operation. It has been difficult to apply this technique of stone detection to a combine harvester. Typically if a single acoustic instrument and sounding plate is used, a stone can only be detected on the side of the crop flow closest to the detector. Stones on the opposite side or center of the crop flow are undetected. There are also additional problems with the feederhouse design. A malfunction with the spring mechanism used to keep the door of conventional stone traps closed can result in crop being inadvertently forced through the stone trap door.

The prior art illustrates these and other short-comings. U.S. Pat. No. 3,675,660 discloses a combine stone trap door premised on the rock detector circuit opening the stone trap door. It is possible that that the stone may be embedded in the crop flow and not deflected to be discharged. U.S. Pat. No. 4,275,546 discloses a stone discriminator using a single sounding plate to detect stones. This approach is unable to detect stones in the upper portion of the crop flow. It has not been able to successfully detect and eject stone sufficiently to be commercially viable. U.S. Pat. No. 4,288,969 discloses an improved stone trap seal. However, because of the angle of the conveying chain, a greater amount of crop is deflected and wasted. U.S. Pat. No. 4,294,062 discloses a single sensing bar positioned at the bottom of the feederhouse and unable to sufficiently detect stones. U.S. Pat. Nos. 4,305,244, 4,322,933 and 4,343,137 illustrates a feederhouse design for a combine. The lower sensing bar is used to trigger the stone trap door. However, the single sensing bar does not sufficiently detect the stones and the angle of the conveying chain results in more crop being deflected than necessary. U.S. Pat. No. 4,355,565 uses a mechanical stone beater bar to force a stone out of the crop flow. However, if the stone is too small or flat, the stone will not be detected or ejected. Also, the stone beater is only effective at lower speeds. U.S. Pat. No. 4,353,199 illustrates a single sensing bar used in a forage harvester. U.S. Pat. No. 4,768,525 illustrates a stone ejection door mechanism for harvesting equipment having a front and rear stone trap doors. U.S. Pat. No. 4,720,962 illustrates a single sensor that can be positioned in a variety of locations on a forage harvester. U.S. Pat. No. 5,702,300 illustrates a combine rock door over center closure apparatus shows a lever used to control a stone trap door.

Accordingly, there is still a need for a foreign object detection and removal system that can effectively remove foreign objects, such as a stone, from an agricultural combine. This is especially important as stones can, for example, cause significant damage to today's improved integral chopper assemblies. The present invention satisfies this need.

BRIEF SUMMARY OF THE INVENTION

In accordance with a preferred embodiment, the present invention provides a foreign object detection and removal system for a combine harvester. The foreign object detection and removal system comprises a feederhouse, a chopper assembly, and a controller. The feederhouse includes a door attached to the feederhouse, an actuator operatively engaged with the door, and an acoustic element within an interior of the feederhouse to detect the presence of a foreign object. The chopper assembly includes a knife bank operatively engaged with a chopper grate assembly. The knife bank is movable between at least a partially disengaged position and a fully engaged position. An actuator is operatively engaged with the knife bank to move the knife bank between the at least partially disengaged and fully engaged positions. The controller is operatively connected to the acoustic element, the actuator operatively engaged with the door, and the actuator operatively engaged with the knife bank. The controller is also configured to receive an input from the acoustic element, and activate the actuator operatively engaged with the door and the actuator operatively engaged with the knife bank.

In accordance with another preferred embodiment, the present invention provides a foreign object detection and removal system of a combine harvester. The foreign object detection and removal system includes a feederhouse, a threshing system, a chopper assembly, an acoustic element and a controller. The feederhouse includes a door attached to the feederhouse and an actuator operatively engaged with the door. The threshing system is operatively connected to the feederhouse for receiving a flow of crop material. The chopper assembly is operatively connected to the threshing system for receiving the flow of crop material from the threshing system and includes a chopper grate assembly, a knife bank operatively engaged with the chopper grate assembly and movable between at least a partially disengaged position and a fully engaged position, and an actuator operatively engaged with the knife bank to move the knife bank between the at least partially disengaged and the fully engaged positions. The acoustic element is operatively connected to the combine upstream (the flow of crop material) from the chopper assembly to detect the presence of a foreign object within the combine. The controller is operatively connected to the acoustic element, the actuator operatively engaged with the door and the actuator operatively engaged with the knife bank. The controller is also configured to receive an input from the acoustic element, and activate the actuator operatively engaged with the door and the actuator operatively engaged with the knife bank.

In accordance with yet another preferred embodiment, the present invention provides a foreign object detection and removal system for a combine harvester. The foreign object detection and removal system comprises a feederhouse, a chopper assembly, and a controller. The feederhouse is configured about a fore portion of the combine harvester and includes a feederhouse housing. The feederhouse housing includes sidewalls and a floor, and a trap door pivotably attached to the floor. The feederhouse also includes an actuator connected to the feederhouse and operatively connected to the trap door to allow the trap door to pivot between an open position and a closed position, and an acoustic element within an interior of the feederhouse for detecting the presence of a foreign object. The chopper assembly is configured about an aft portion of the combine harvester and includes a rotary chopper element, a chopper grate assembly in a spaced apart relation to the rotary chopper element forming an passageway to allow the flow of a crop residue therebetween, a knife bank adjustably connected to the chopper grate assembly to move the knife bank between a first position wherein the knife bank is at least partially retracted from the chopper grate assembly and a second position wherein the knife bank is fully engaged with the chopper grate assembly, and a knife bank actuator operatively connected to the knife bank to move the knife bank to either the first or second position. The controller is operatively connected to the acoustic element, the actuator, and the knife bank actuator. The controller is also configured to receive an input signal from the acoustic element indicating the presence of the foreign object, and activate the actuator of the feederhouse and the knife bank actuator of the chopper grate assembly in response to the input signal from the acoustic element of the feederhouse to allow the trap door of the feederhouse to pivot to the open position and to move the knife bank of the chopper assembly to the first position wherein the knife bank is at least partially retracted from the chopper grate assembly.

DETAILED DESCRIPTION OF THE INVENTION

In a preferred embodiment, the present invention provides for a foreign object detection and removal system for a combine harvester that includes a feederhouse having a detection system for detecting and removing foreign objects. The foreign object can be a stone or any other object of sufficient bulk detectable by the combine's acoustic sensors, such as wood, metal objects, or other dense materials. As generally understood in the art, crop and crop related materials are not considered foreign objects. The foreign object detection and removal system also includes an integrated chopper assembly that includes an actuator, such as a linear actuator, a pneumatic actuator, an electric actuator, a motor, a hydraulic cylinder, or a solenoid operatively connected to a knife bank, and a controller operatively connected to the feederhouse and the integral chopper assembly.

Figure 1:
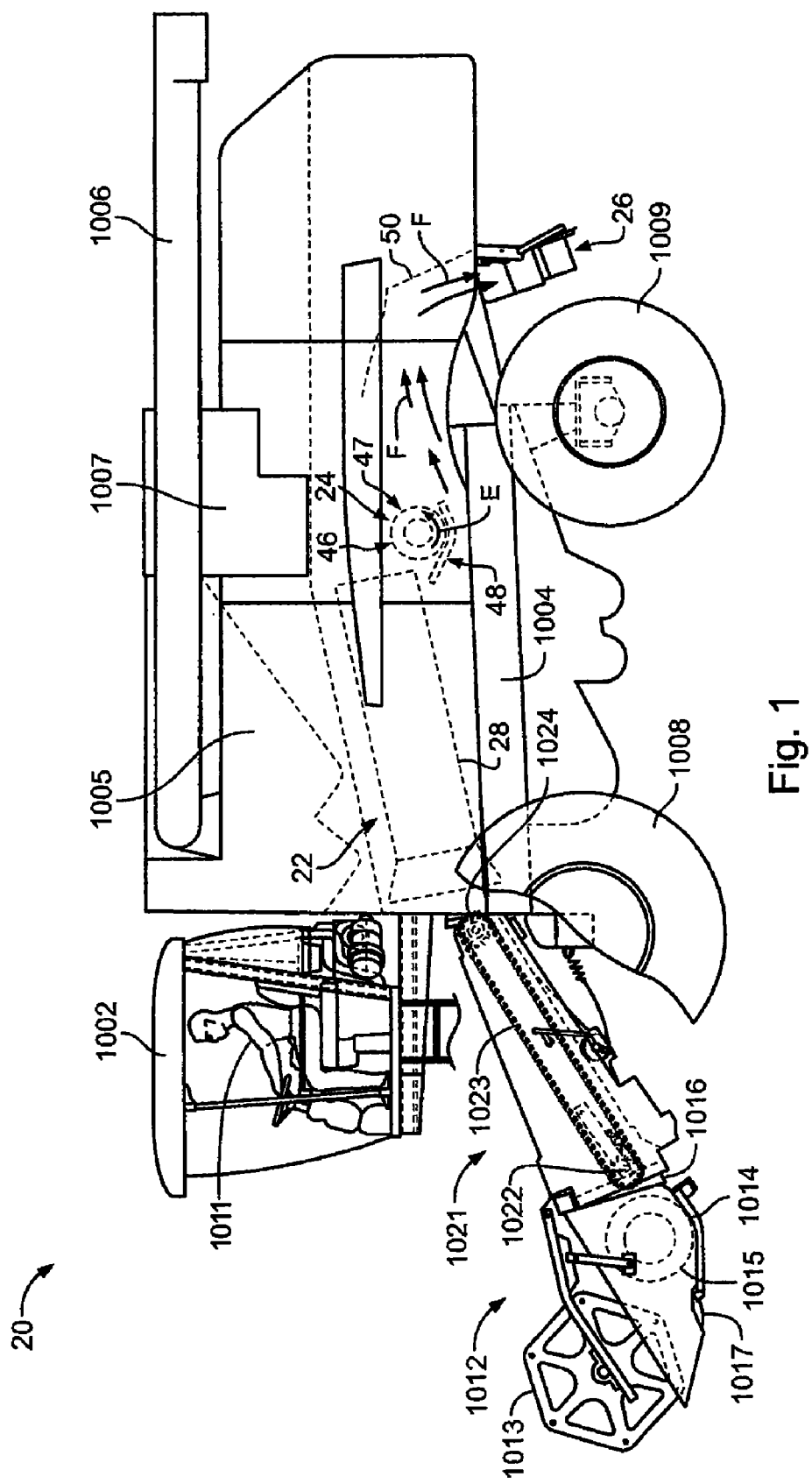
FIG. 1 is a simplified side plan view, from the left side, of an agricultural combine, illustrating, in dotted outline, an axially arranged threshing system of the combine, an improved integral chopper assembly of the residue treatment and distribution system, a feederhouse and a header of the combine that includes the present invention.
Figure 2:
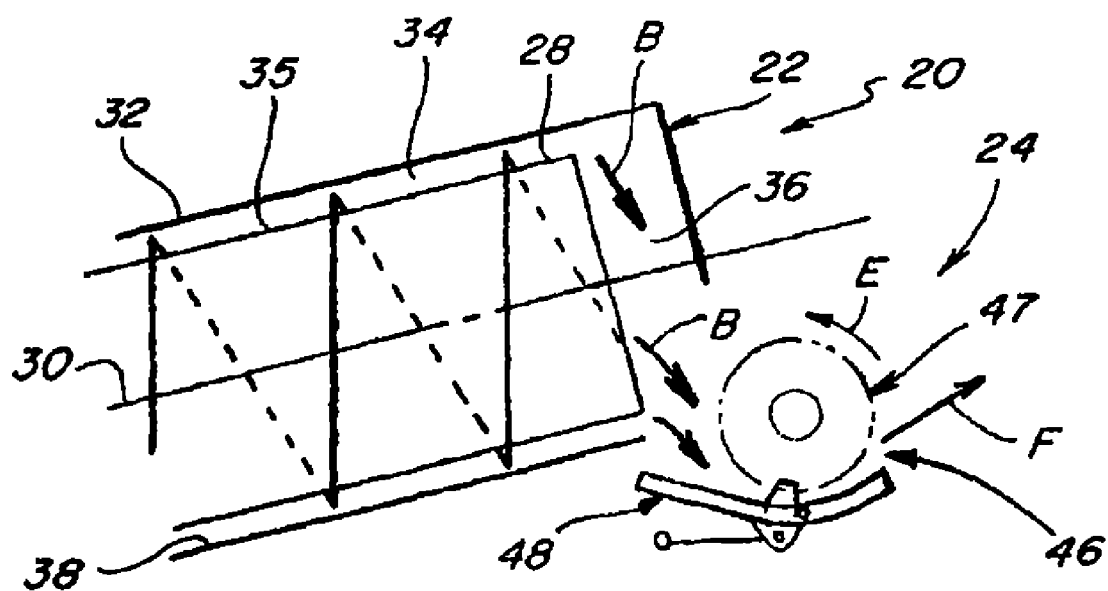
FIG. 2 is a simplified side plan view, from the left side, of the threshing system and a portion of the crop residue treatment and distribution system of the combine of FIG. 1, further illustrating the flow of crop residue to and through the integral chopper assembly.

Referring now to the drawings, wherein preferred embodiments of an improved integral chopper assembly 46 are shown, wherein like numerals refer to like items, wherein certain elements and features may be labeled or marked on a representative basis without each like element or feature necessarily being individually shown, labeled, or marked, and wherein certain elements are labeled and marked in only some, but not all, of the drawing figures. FIGS. 1 and 2 depict a representative agricultural combine 20 that includes a longitudinally axially arranged threshing system 22 and a crop residue treatment and distribution system 24 with a crop residue spreader 26.

As can be generally and essentially observed from a review and study of FIGS. 1-2, threshing system 22 receives a flow of crop material from the feederhouse 1021 and is axially arranged in that it includes a cylindrical threshing rotor 28 conventionally supported and rotatable in a predetermined, typically clockwise direction, about a rotational axis 30 therethrough and within a concave 32 (FIG. 2), for conveying a flow of crop material in a helical flow path through a space 34 extending circumferentially around an outer cylindrical surface 35 of rotor 28 and an inner circumferential surface 38 of concave 32. As the crop material is moved through space 34, the crop, such as grain, legumes, or the like, will be loosened and separated from crop residue such as husk and pods, and carried away therefrom in the well known conventional manner.

As may be best illustrated by FIG. 2, the crop residue will continue along a helical path through space 34, and will be expelled therefrom, as denoted by arrows B, into and through a discharge opening and passage 36, which essentially comprises an extension of space 34 at the downstream end of threshing rotor 28. The consistency of the flow of crop residue, volume thereof, and extent or pattern thereof, will typically vary, and be a function of a variety of conditions, including, but not limited to, the speed of rotation of rotor 28, crop type, plant maturity, moisture content, and weather conditions. As an example, rotor speeds can vary between just a few hundred RPM and over 1000 RPM. Wheat and other small grains will typically have relatively small crop residue components, whereas other grains, such as corn, will typically have larger components, such as thick stalk segments, cob fragments, and large leaves.

Crop residue treatment and distribution system 24 will typically include a transport and chopping assembly, such as integral chopper assembly 46 configured about an aft portion of the combine 20, sometimes hereinafter referred to as rotary assembly 46 having a rotary chopper element 47 rotatable in a direction E above a concave pan assembly such as chopper grate assembly 48. The chopper assembly 46 is operatively connected downstream of the threshing system 22 to receive the flow of crop material from the threshing system 22. Rotary chopper element 47 typically rotates at a rapid speed, so as to be capable of accelerating and propelling a flow of crop residue rearwardly within the confines of the rear end of combine 20, as generally denoted by arrows F. The speed of the rotary chopper element 47 can be operatively controlled by a controller 1080, as further described below. Such rearward flow is typically guided and directed by internal panels or shields, generally denoted by shields 50 (FIG. 1), so as to either flow through a rear opening so as to be deposited directly onto a field, such as in a windrow, or flow into a secondary crop residue chopper and/or spreader, such as chopper/spreader 26, for spreading thereby in a swath on the field.

In the further consideration of the drawings of this application and the discussion of such drawings and the elements shown therein, it should also be understood and appreciated that, for purposes of clarity in various of such drawings, pluralities of generally like elements positioned near to one another or extending along some distance may sometimes, if not often, be depicted as one or more representative elements with extended phantom lines indicating the general extent of such like elements. In such instances, the various elements so represented may generally be considered to be generally like the representative element depicted and generally operable in a like manner and for a like purpose as the representative element depicted.

Figure 3:
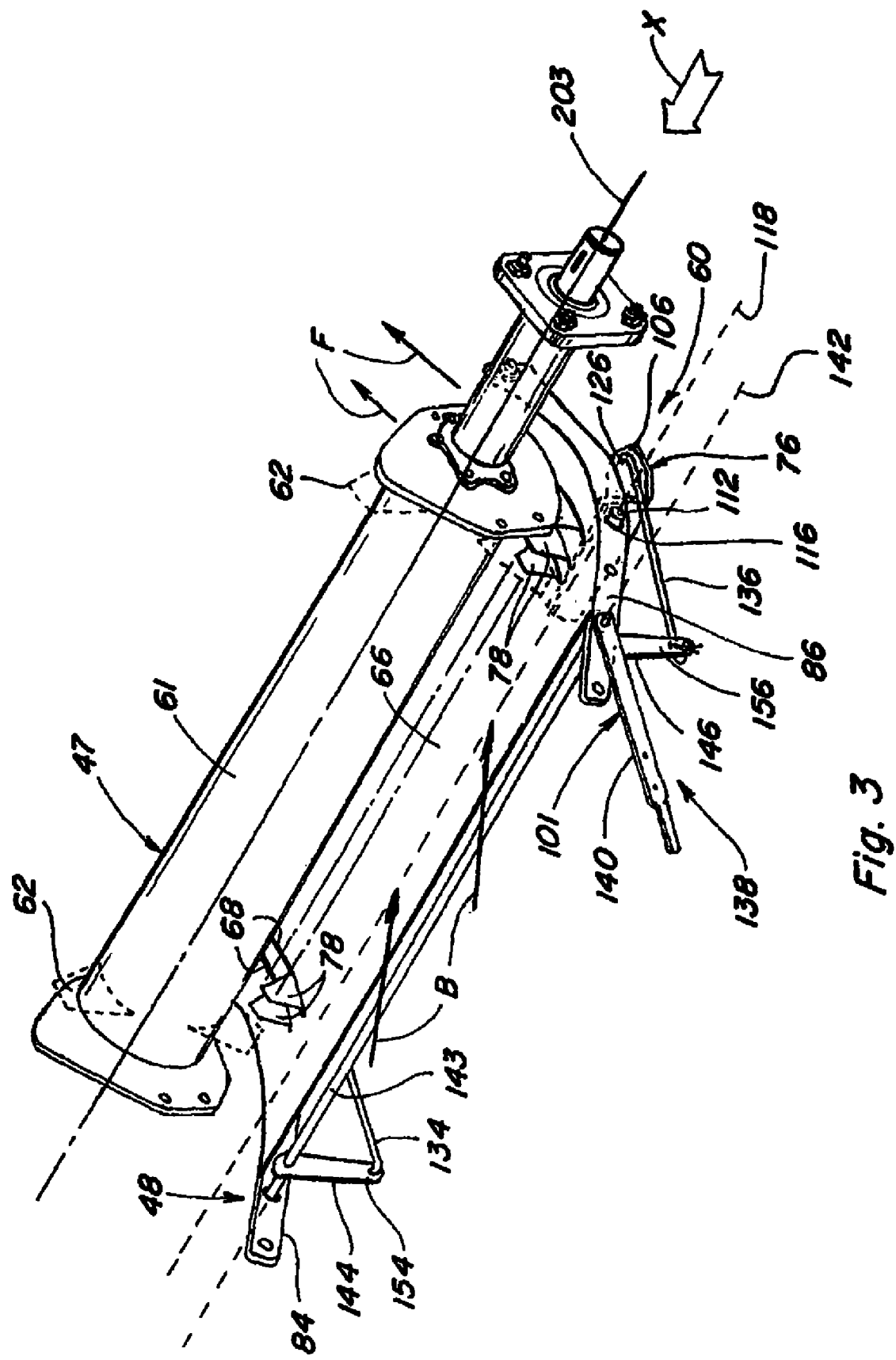
FIG. 3 is a perspective view, from the left front side of a chopper assembly, generally depicting one preferred embodiment of a counter knife assembly of the integral chopper assembly of FIGS. 1 and 2, wherein, for purposes of clarity, knife blades on the rotary chopper element of the integral chopper assembly are shown in dotted outline only and phantom lines along the central portions of the rotary chopper element and the grate assembly should be considered to include therealong various components, representative components of which are depicted to the outer sides thereof.
Figure 4:
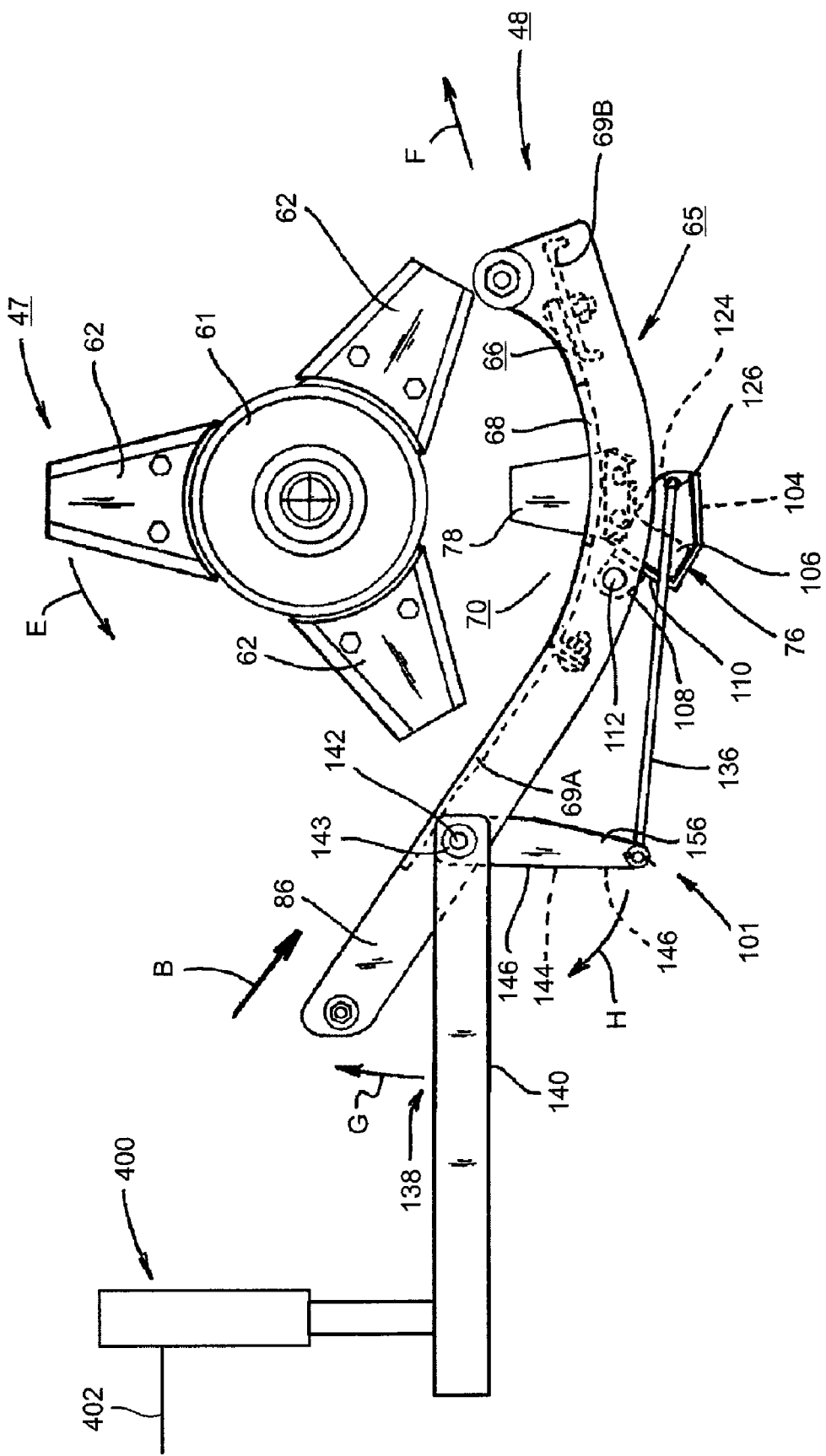
FIG. 4 is a simplified left side plan view, generally viewed from position X in FIG. 3, of a portion of the integral chopper assembly of FIG. 3, including the counter knife assembly and a actuator.

In light of the foregoing, FIGS. 3-4 thus depict generally a portion of an integral chopper assembly 46 that includes not only a concave pan portion that employs a replaceable grate portion and an interruption plate downstream from the slots in the grate portion of the chopper grate assembly, but also various other features of note, including, as one feature, a rotary chopper portion or element 47 that extends generally horizontally across the flow path of the crop residue above the chopper grate assembly 48, which chopper grate assembly includes as a portion thereof the counter knife assembly 60. Such rotary chopper element 47 includes a cylindrical element or like rotary member 61, and has a number of paddles or knife blades 62, only representative ring sets of which are individually depicted in FIGS. 3 and 4, mounted or affixed thereto at a plurality of mounting locations distributed about its periphery. The particular positionings, arrangements, and configurations of such plurality of paddles or knife blades 62 will be addressed further hereinafter.

Figure 5:
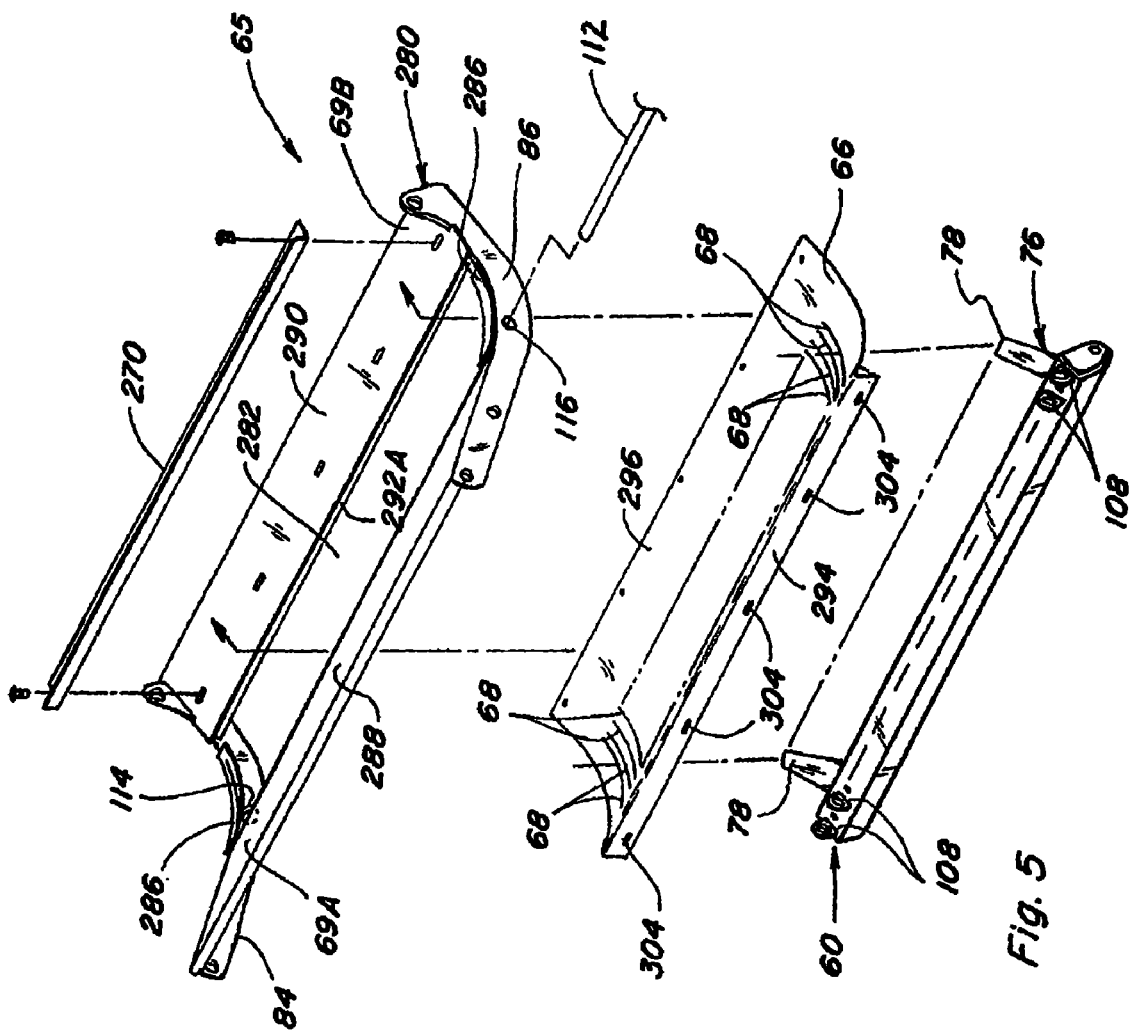
FIG. 5 is an exploded perspective view of various portions of the concave pan portion of the integral chopper assembly of FIGS. 3 and 4.

FIG. 5 depicts in an exploded view various components of the chopper grate assembly 48 of the integral chopper assembly 46, including a generally concave pan portion 65, sometimes hereinafter also referred to as a concave pan assembly. Such concave pan portion 65 includes a grate portion 66 that extends generally parallel to the rotary chopper element 47 (as better shown in FIG. 3) with a plurality of spaced slots 68 therealong, the purpose and configurations of which slots 68 will be further addressed hereinafter, disposed between leading and trailing plate portions 69A and 69B. For purposes of clarity, not all of the slots in the grate portion 66, including especially a plurality of slots along and/or within the phantom lines in the central portion of the grate portion 66, are depicted in FIGS. 3 and 5.

As will be appreciated by those skilled in the art, the grate portion 66 and the leading and trailing portions 69A and 69B of the chopper gate assembly 48 have often in the past been welded together as part of the larger component concave pan portion 65. In the particular embodiment depicted in FIG. 5, however, such components 66, 69A, and 69B are shown as separate elements that, for purposes that will be further discussed hereinafter, may be matably joined together with one another and other components to form the concave pan portion 65, as will be further explained in that which follows.

As may now be better observed from FIG. 4, rotary chopper element 47 and grate portion 66 of concave pan portion 65 of chopper grate assembly 48 define a passageway 70 therebetween for the crop residue flow that is directed to the integral chopper assembly 46 for treatment thereby, such as crop residue flow B from the threshing system 22 (FIG. 2). The slots 68 in grate portion 66 are generally elongated and extend along such grate portion 66 generally in the direction of the crop residue flow B.

With reference, now, to all of FIGS. 3-5, counter knife assembly 60 includes a stationary knife bank 76 positioned generally beneath and parallel to both rotary chopper element 47 and grate portion 66, having a plurality of spaced knife elements 78 therealong. Such knife elements 78 are mounted at positions along knife bank 76 generally alignable with slots 68 in grate portion 66 that are coordinately sized and configured to permit the knife elements 78 to be movable to project through slots 68.

Figure 6:
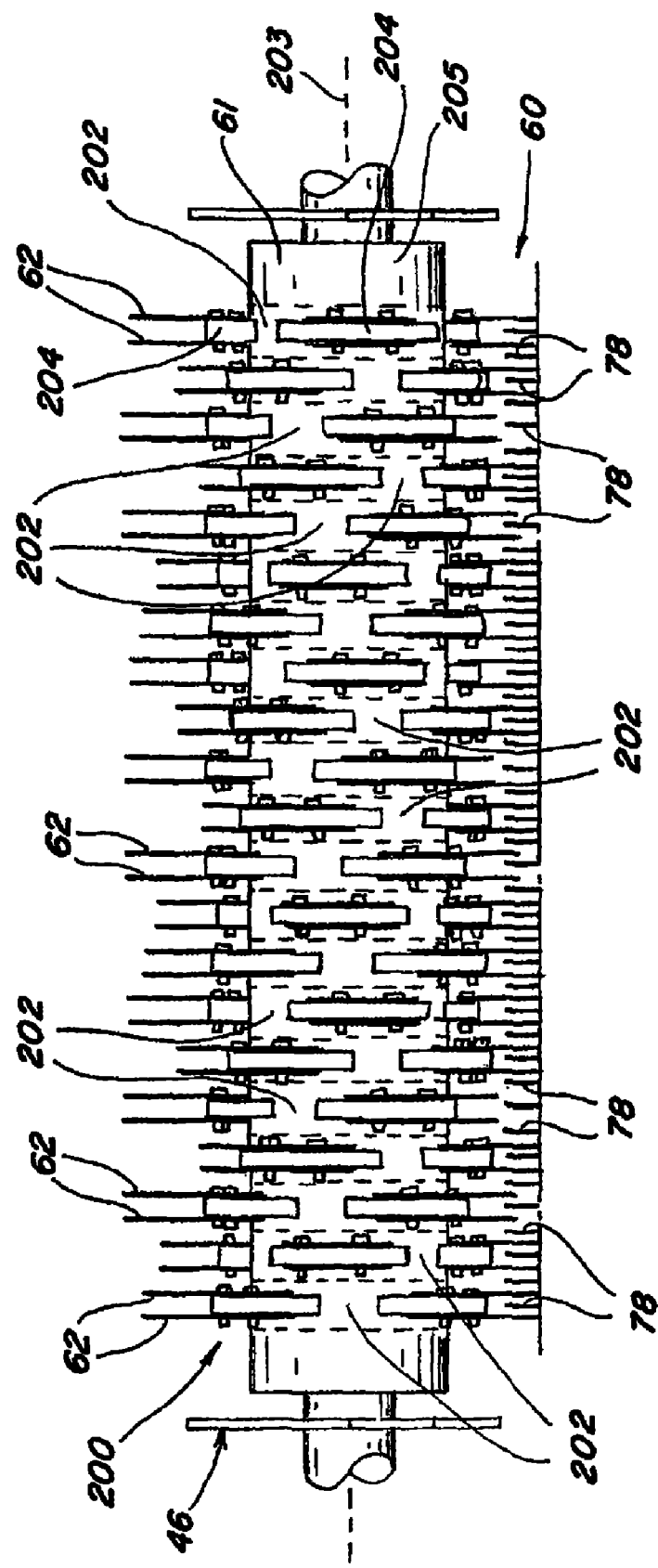
FIG. 6 is a plan view looking forwardly from the rear of the integral chopper assembly towards the rotary chopper element thereof, depicting a preferred knife blade arrangement with a plurality of generally like ring portions shown axially stacked side-by-side along the longitudinal axis of the rotary member, with the knife blades on the rotary member interengaging knife elements of the counter knife assembly of the chopper grate assembly.

Slots 68 and knife elements 78 are appropriately positioned relative to knife blades 62 of rotary chopper element 47 to permit the knife elements 78 and knife blades 62 to be interengagable with one another, especially as rotary chopper element 47 is rotated, so as to pass adjacent to one another without contacting one another. Such interengagable movement is illustrated in FIG. 6, which depicts the rotary element 47 and top portions of the knife elements 78 of the counter knife assembly 60 when such knife elements 78 project through slots 68 of the grate portion 66 into the flow passageway 70 (FIG. 4). Such knife blades 62 and knife elements 78 are so mounted that they are interengageable with one another during a chopping operation without contacting or interfering with one another.

With reference again to FIGS. 3-4, the integral chopper assembly 46 therein depicted also preferably includes an adjustment mechanism 101 for adjustably varying the positioning of the knife bank assembly 76 relative to the grate portion 66 of the chopper grate assembly 48 between a fully engaged position wherein the knife elements 78 of the knife bank assembly 76 alignedly extend through the slots 68 of the grate portion 66 of the chopper grate assembly 48 at maximal projection and a partially or fully retracted position wherein the knife elements 78 project minimally, if at all, through the slots 68. In such embodiment, knife bank 76, which extends between first and second knife bank end plates 104 and 106 thereof, with knife bank end plate 104 being behind and obscured by knife bank 106 in FIG. 4, is generally spaced from and parallel to both rotary chopper element 47 and grate portion 66, extending in a journalled arrangement between opposed side wall or plates 84 and 86 of the concave pan portion 65.

As shown in FIGS. 4-5, the counter knife bank 76, which is dimensioned to extend generally the width of the grate portion 66 between knife bank end plates 104 and 106, includes spaced mounting eyelets 108, including additional eyelets represented as being disposed along the phantom line between the representative eyelets 108 depicted in FIG. 5, along a side 110 thereof through which a shaft member 112 extends between journalled end connections 114 and 116 on the respective opposed side plates 84 and 86 of concave pan portion 65. Such shaft member 112, when so mounted through journalled end connections 114 and 116, defines an engagement positioning axis 118 (FIG. 3), sometimes hereinafter also referred to as swivel axis 118, about which knife bank 76 can be rotated in an arc-like movement.

Knife bank end plates 104 and 106 also include lower portions 124 and 126, with portion 124 being behind and obscured by portion 126 in FIG. 4, which are operatively connected, as better shown in FIG. 3, via respective positioning rods 134 and 136 to a lever assembly 138 which is operable to effect, through the coupled movement of positioning rods 134 and 136, a rotation of knife bank end plates 104 and 106 and the knife bank 76 journalled thereto about swivel axis 118, the consequence of which is the retraction of the knife elements 78 from the flow passageway 70 (FIG. 4). Lever assembly 138 includes an operable lever 140 coupled at axis 142 to a rotatable connecting rod 143 that extends between side plates or walls 84 and 86 of concave pan portion 65, which connecting rod 143 is attached to support links 144 and 146. Support links 144 and 146 are respectively connected to positioning rods 134 and 136.

With further reference to both FIGS. 3 and 4, when lever 140 is operated, as denoted by arrow G in FIG. 4, support links 144 and 146 are caused to rotate thereby effecting rotational movement of end portions 154 and 156 of support links 144 and 146 about axis 142, as denoted by arrow H in FIG. 4, consequent movement of positioning rods 134 and 136, and the resultant rotational movement of the knife bank assembly 76, including knife bank end plates 104 and 106, about swivel axis 118. By thus operating, and then fixing the status of lever assembly 138 at a given position, a user can conveniently alter and fix the positioning of the knife bank 76 relative to grate portion 66, thereby controlling to some extent the amount by which the knife elements 78 are allowed to project through slots 68.

The ability to effect a repositioning of the knife bank 76 relative to grate portion 66 is beneficial in circumstances where a user finds it desirable to be able to withdraw or retract the knife elements 78 of the counter knife assembly 60 from the flow passage 70, such as to clear obstructions/foreign objects as well as in circumstances where the user wishes to adjust the quality of the chop. Typically, the greater the amount of projection, the finer the chop, and the less the amount of projection, the coarser the chop.

It will be understood and appreciated by those skilled in the art that, although the position of knife bank 76 in the embodiment of FIGS. 3-4 is shown controlled by the operation of a lever assembly 138 and associated linkages, various other mechanisms and devices could equally as well be utilized to control the positioning of positioning rods 134 and 136 or, more directly, the swivel positioning of knife bank end plates 104 and 106, or even the placement of knife bank 76 closer or farther from grate portion 66. Such mechanisms and devices may be manually or automatedly operable, including remotely by a user, such as from the cab of a combine, and may include various and sundry systems and components of well known construction for effecting the desired movements, placements, or positioning.

For example, as shown in FIG. 4, a solenoid 400 can be operatively connected to the lever assembly 138. Preferably, the solenoid 400 is connected to the lever 140. The solenoid 400 can be, for example, a New Holland solenoid model 681923, which is a push type solenoid. The solenoid 400 receives a signal i.e., an input, from a controller 1080 (further discussed below) through solenoid wires 402. While a solenoid 400 is preferable, the actuating means can alternative be an actuator, hydraulic cylinder, a linear actuator, an pneumatic actuator, an electric actuator, a motor or the like. Each of these alternative actuating means can be configured to be operatively engaged with the knife bank 76.

While the solenoid 400 is preferably connected to the lever assembly 138, the solenoid 400 can alternatively be connected in general to the knife bank 76 anywhere along its structure so as to move the knife bank 76 from a fully engaged position to at least a partially retracted position. That is, the solenoid 400 can move the knife bank 76 from a first position (such as where the knife bank 76 is at least partially retracted from the chopper grate assembly 48) and a second position (such as where the knife bank 76 is fully engaged with the chopper grate assembly 48). Thus, the present embodiment advantageously provides the ability to reposition the knife bank 76 relative to e.g., the grate portion 66 so as to withdraw or retract the knife elements 78 of the counter knife assembly 60 from the flow passage 70, such that obstructions and foreign objections can be cleared from the chopper grate assembly 48.

Much of the discussion that now follows, particularly regarding FIGS. 6-18, describes noteworthy features and components of the preferred integral chopper assembly that has been developed, and the operation thereof. Inasmuch as the preferred integral chopper assembly that is so discussed is currently considered to include the best mode of the subject invention to effect the advantages sought therefor, such discussion is considered instructive and helpful to an understanding and appreciation of the manner in which the invention that is the subject of this application, which will thereafter be described and discussed in greater detail, functions and operates within the preferred integral chopper system. Consequently, the following discussion, except when it actually turns to and is directly addressing the subject invention, is not intended to, and should not be considered to, set forth requirements for or limitations to any features or components that are or may be advantageously employed with the subject invention in integral chopper systems, but should instead be considered as background information and/or as information that enhances an understanding of the subject invention and its operation.

As has been noted hereinbefore, in many previous integral chopper assembly constructions, the knife blades or paddles had been disposed on the rotary member 61 in rows and columns, though sometimes in differing array configurations. It has now been discovered that better performance and throughput, especially when the system may be operated in dual or alternative residue transport modes, as discussed hereinabove, can be realized by mounting or affixing knife blades, preferably in a side-by-side paired configuration, about the rotary member in a plurality of knife helixes, with a plurality of rings, or rows, of knife blades disposed in an ordered, or stacked, arrangement along the longitudinal axis of the rotary member 61.

In such regard, FIG. 6 shows one preferred knife blade arrangement 200 in which twenty-one (21) generally like ring portions 202 are axially stacked side-by-side along the longitudinal axis 203 of rotary member 61. As better shown in FIG. 7, which depicts an endmost, but generally representative, ring or row portion 202 on rotary member 61, three mounts or mounting lugs 204, sometimes hereinafter referred to more simply as lugs, are affixed, such as by welding, to the outer periphery 205 of rotary member 61 at spaced annular intervals that are generally equal to one another, in this instance with the midpoints of the lugs 204 being spaced approximately 120° apart.

As may best observed from FIGS. 7-10, each lug 204 is preferably designed to include a central yoke member 206 of a predetermined yoke thickness Yt (as better observed in FIGS. 8-9) that has an end-to-end yoke length Yl (as better observed in FIG. 7) and extends around a portion of the rotary member 61 to which individual knife blades 62 can be mounted, preferably in pairs, but also singularly, if so desired. Preferably, the leading end or edge 207 of the lug 204 is beveled so that any residue flowing into such leading edge 207 will be directed upwardly and over, or around, the lug 204 instead of hairpinning against the leading edge thereof.

In the embodiment depicted in FIGS. 5-10, the individual knife blades 62 are shown connected to the lugs 204 by nut and bolt arrangements 208 to form a mounted assembly 209, although other connection techniques and constructions could be equally as well employed for such purpose and to like effect.

Figure 7:
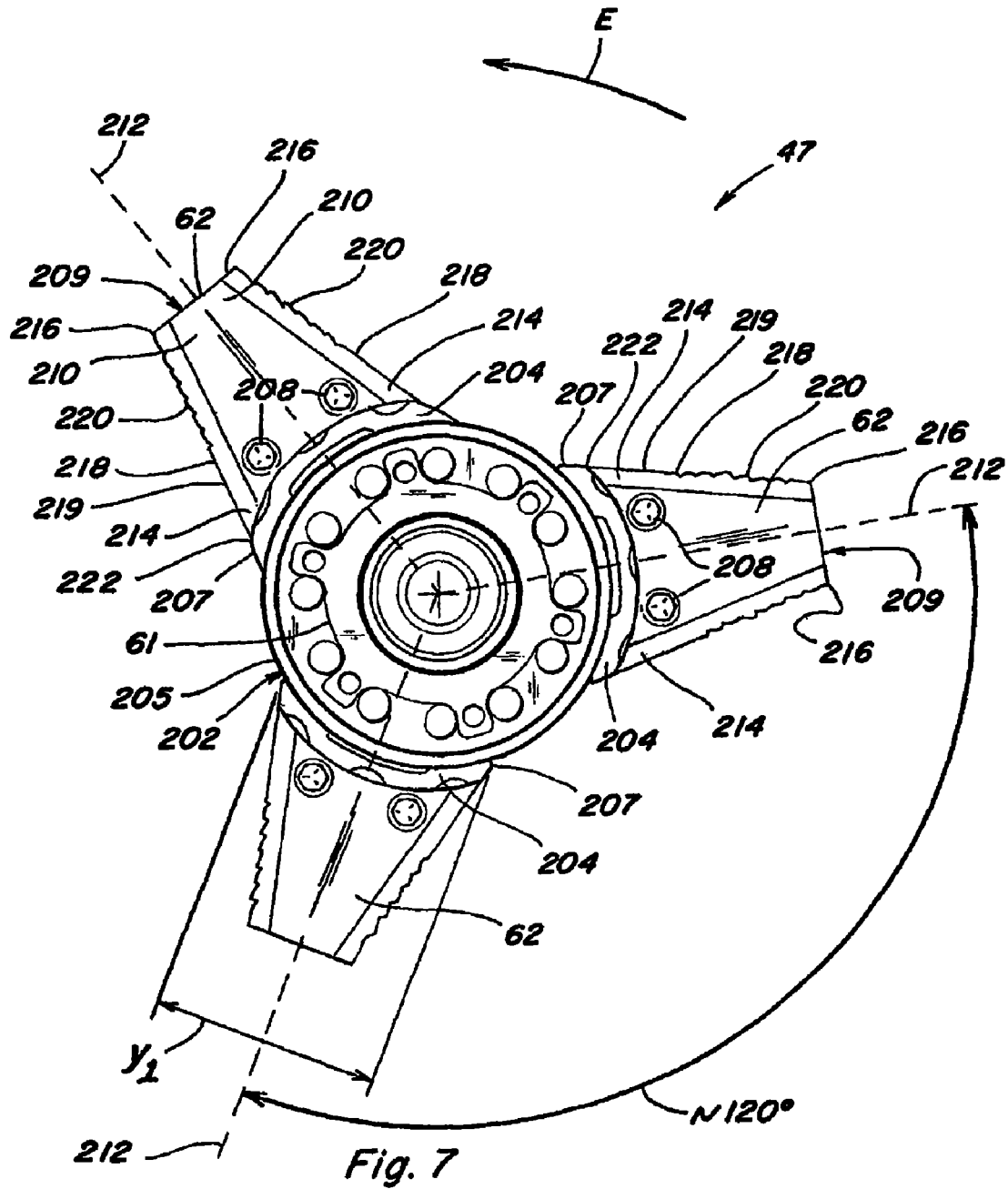
FIG. 7 is an end plan view of the rotary chopper element depicted in FIG. 6, showing the endmost, but generally representative, ring portion on the rotary member.
Figure 8:
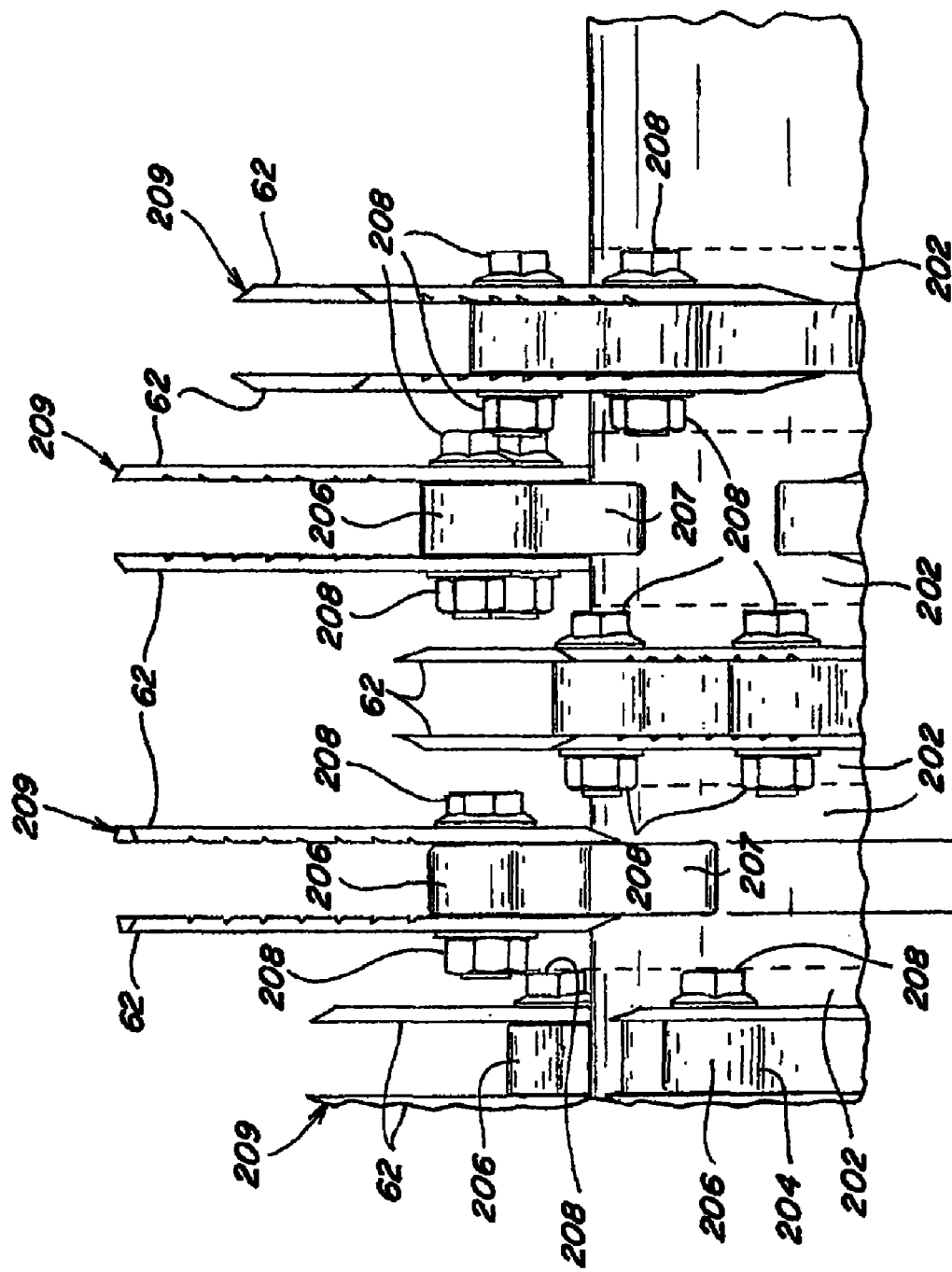
FIG. 8 is an enlarged view of a portion of the rotary chopper element of FIG. 6, showing in greater detail the relationship of certain components of such rotary chopper element.
Figure 9:
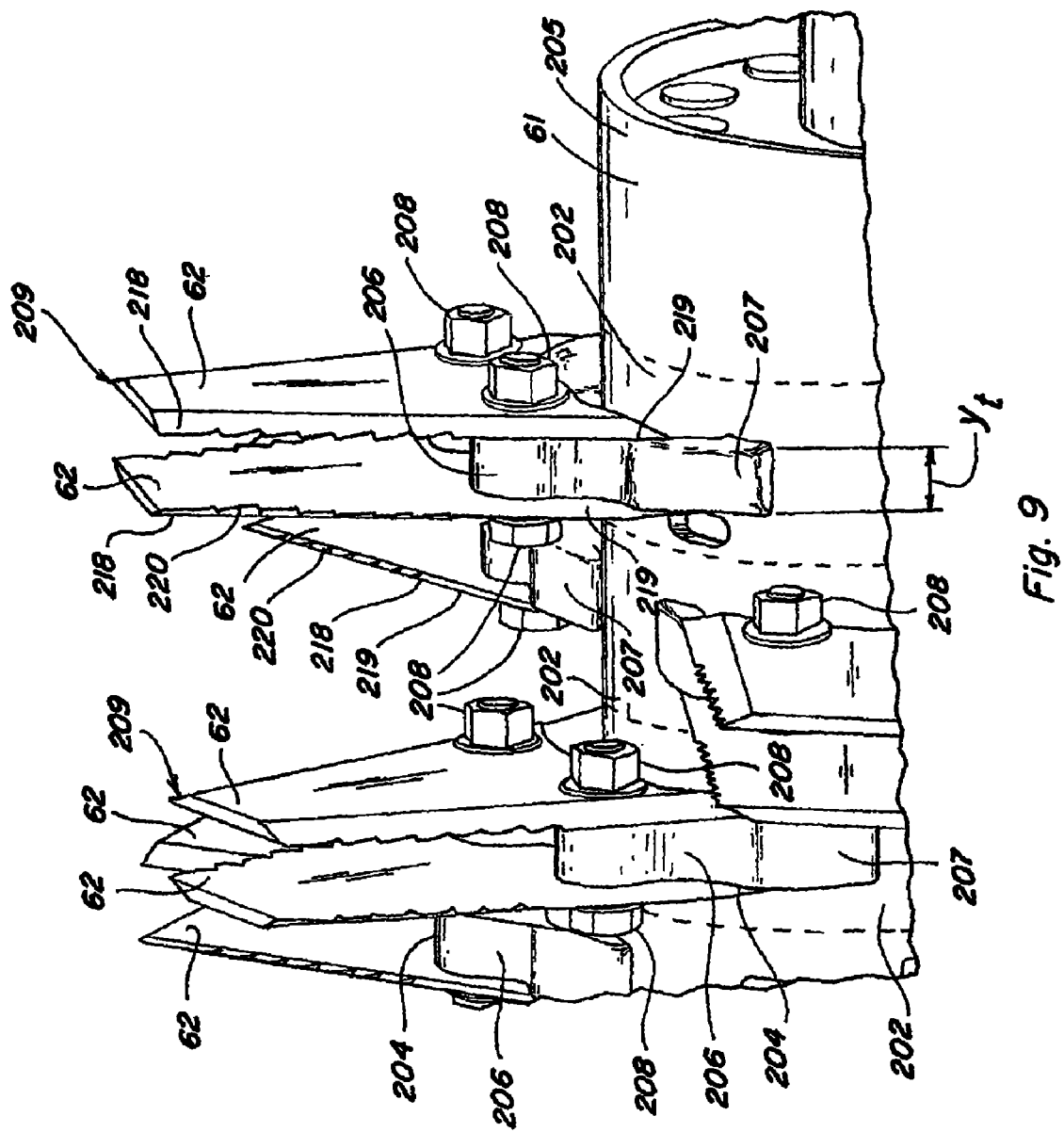
FIG. 9 is an enlarged perspective view of a portion of the rotary chopper element of FIG. 6, also showing in greater detail the relationship of certain components of such rotary chopper element.

As may be better observed in FIG. 7, the individual knife blades 62 are preferably formed to include two mirror image portions 210 about a center line 212 and are beveled from their bases 214 to their tips 216 to form cutting edges 218, portions 220 of which may be serrated. Such mirror image design permits easy reversibility of a blade on a mounting lug when the leading cutting edge becomes dulled so that the still sharpened mirror image cutting edge can thereafter be utilized as the leading cutting edge. Knife blades of such design may be connected to the mounting lugs 204 as shown in FIGS. 5-10 such that the leading edges 207 of the lugs 204 and the leading cutting edges 218 of the mounted knife blades 62 together form a continuous beveled leading edge 219 for the mounted assembly 209, though perhaps, as better shown in FIG. 11, with a discontinuity at the point 222 where the leading cutting edge 218 of knife blade 62 meets the leading edge 207 of lug 204.

Figure 10:
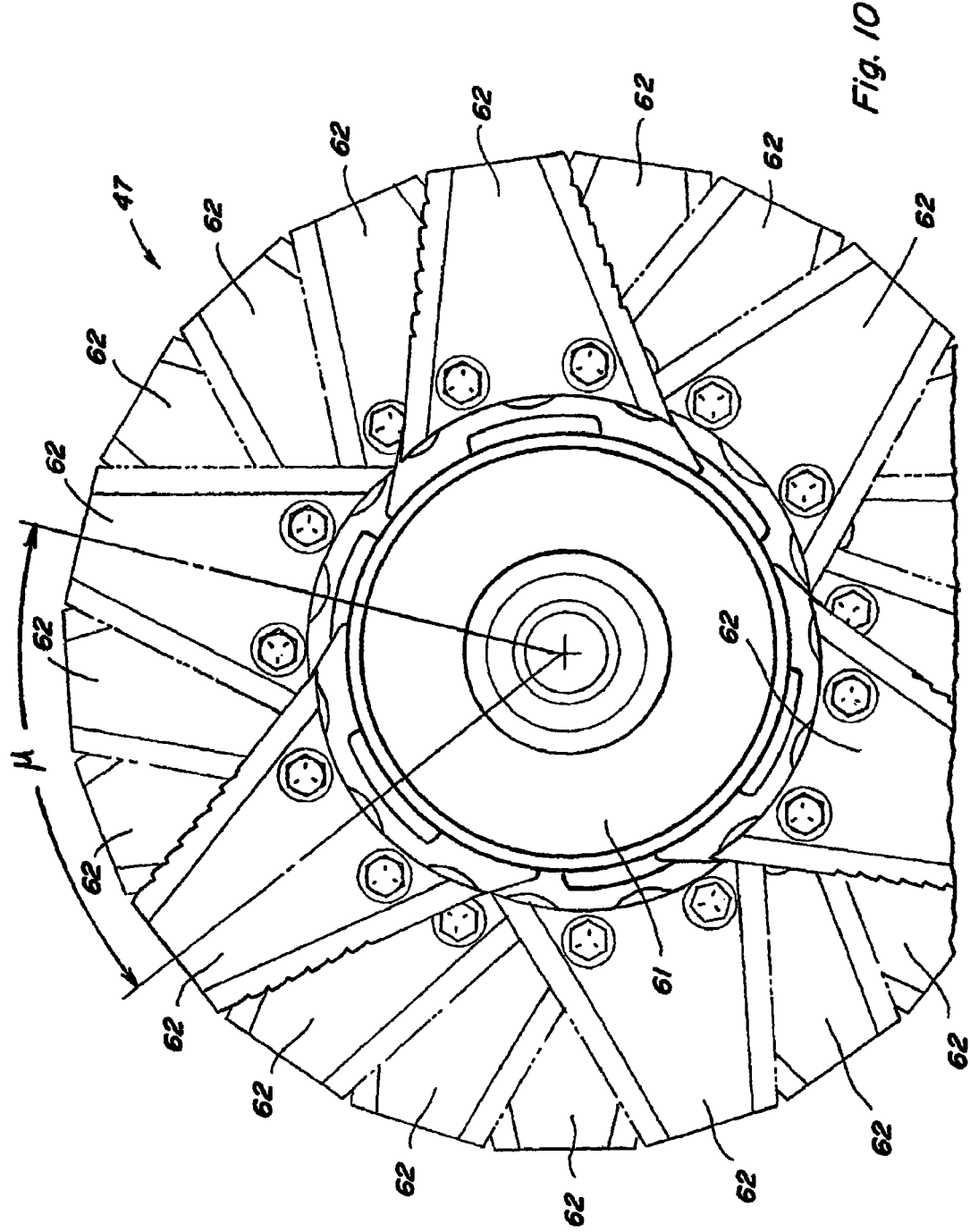
FIG. 10 is an enlarged partial end view of the rotary element of FIG. 6, similar in some respects to FIG. 7, but also showing the knife blades as mounted on additional ring portions along the rotary member and illustrating a preferred radial offset between the knife blade mountings on successive ring portions.
Figure 11:
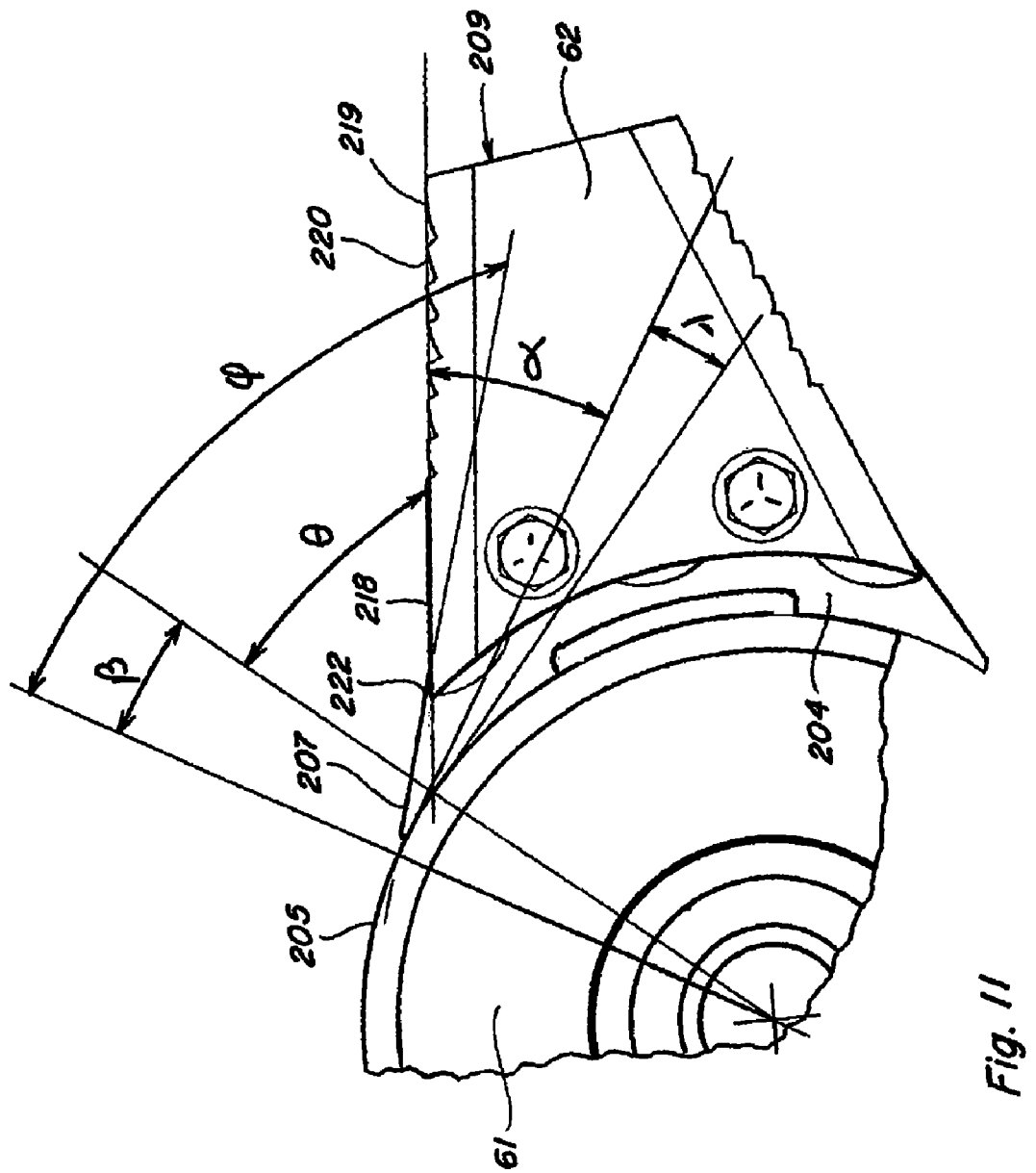
FIG. 11 an enlarged partial end view of the rotary chopper element of FIG. 6, similar in some respects to FIG. 7, but showing only a single mounted assembly on the ring portion and illustrating various angular relationships between certain elements thereof.

With the particular embodiment of FIGS. 5-11, as is better observed in FIG. 11, the leading edges 207 of lugs 204 and the leading cutting edges 218 of knife blades 62 are raked back from perpendicular by differing amounts. As shown in FIG. 11, in such preferred embodiment the leading edge 207 of lug 204 is raked back at an $\Phi$ of approximately 75° and the leading cutting edge 218 of knife blade 62 is raked back at an angle $\Theta$ of approximately 55°, with the angle $\beta$ of displacement or offset of the point of intersection of the leading cutting edge 212 of knife blade 62 with the rotary member 61 from the point of intersection of the leading edge 207 of lug 204 with the rotary member 61 being approximately 10°. With such an embodiment, angle $\alpha$ is approximately 25° and angle $\lambda$ is approximately equal to angle $\beta$. For embodiments such as shown in FIGS. 5-11, it is considered desirable that angle $\beta$, and so also angle $\lambda$, within a range of about 10°-20°.

Figure 12:
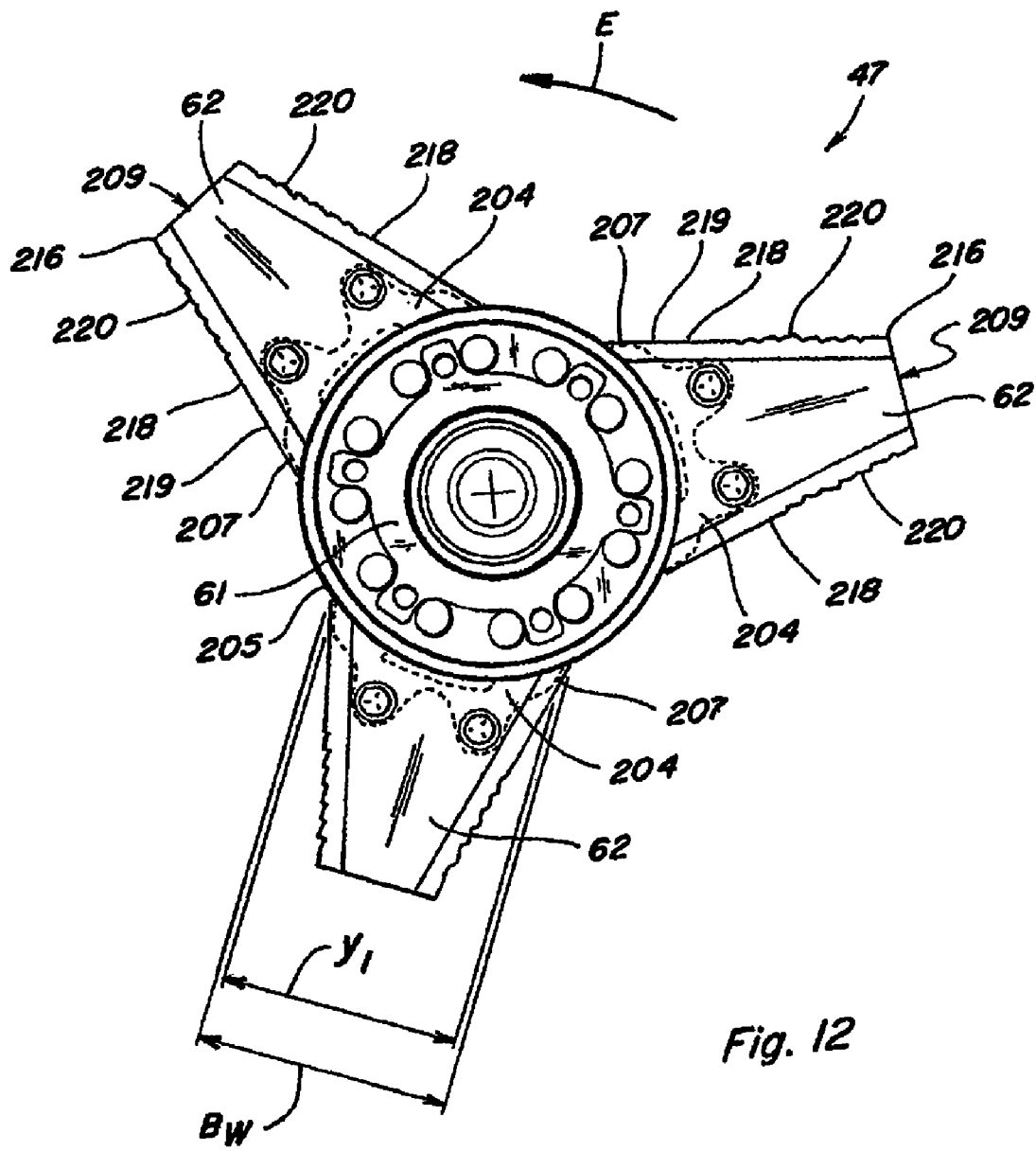
FIG. 12 is an end plan view of the rotary chopper element depicted in FIG. 6, similar in many respects to FIG. 7, but with an alternative mounted assembly wherein the blade width of the knife blades mounted to a mounting lug is greater than the yoke length of the mounting lug.

Even more preferably, however, as shown in FIG. 12, the knife blades 62 may be formed to have a blade base width Bw that is greater than the yoke length Yl so that the blade 62 can be so mounted to the lugs 204 to generally span the entire length Yl of the yoke member 206 and to project slightly beyond the opposed ends of the yoke member 206, with the cutting edges 218 of the knife blades 62 extending down to the outer surface of the rotary member 61. Due to the curvature of the outer surface of the rotary member 61, and for the knife blades to properly be engagable with the mounting lugs 204, the base portions of knife blades having such features will generally have a concave profile or a recessed center portion between the cutting edges 218. With knife blades of such design, the leading cutting edge 218 will extend from the rotary member 61 to the tip 216 of the knife blade 62 and be presented as the leading edge 219 of the mounted assembly 209.

In general, regardless of the particular knife blade and lug configurations, the leading edge 219 of the mounted assembly 209 will be disposed to lie between the position of a perpendicular to the rotary member 61 and a tangent to the rotary member 61, i.e., at a rake angle $\epsilon$ where $0°<\epsilon\leq 90°$, although the height, as well as the leading edge design, of the lug 204 to which the blade 62 is attached may limit the maximum rake angle realizable, especially since it is desired that the leading edge 219 of the mounted assembly 209 presented to the residue passing between the rotary element 47 and the chopper grate assembly 48 be beveled, preferably with the knife blade 62 forming the leading edge, to minimize hairpinning of residue against such leading edge.

The ring portions 202 of rotary member 61 are axially stacked relative to one another along the longitudinal axis 203 (FIG. 6) of the rotary member 61, with the lugs 204 of each succeeding ring portion 202 being rotated or radially offset from the lugs 204 of the preceding ring portion by about 54.1±15°, as best observed in FIG. 10, wherein angle u is approximately 54°, resulting in three (3) generally parallel blade helixes that wrap around the length of rotary member 61. With such a noted offset of 54.1±15° and twenty-one (21) ring portions, each helix will wrap around the rotary member between about two (2) and four (4) times, which arrangement has been found advantageous for advancing crop residue between the rotary member 61 and the chopper grate assembly 48, regardless of whether the rotary member is being rotated at about 3000 RPM or 800 RPM and regardless of whether or not the counter knife assembly 60 is positioned in an engaged or retracted position.

For ease of reference, such knife blade arrangement may hereinafter sometimes be referred to a 3×3 rotor array due to the positioning of three mounting lugs at spaced locations around each ring portion. Depending upon desires of users and the particular designs of mounting lugs and knife blades utilized, greater or lesser pluralities of mounting lugs can be positioned around each ring portion to obtain knife blade arrangements with greater or fewer generally parallel helixes on the rotary member 61.

Figure 13:
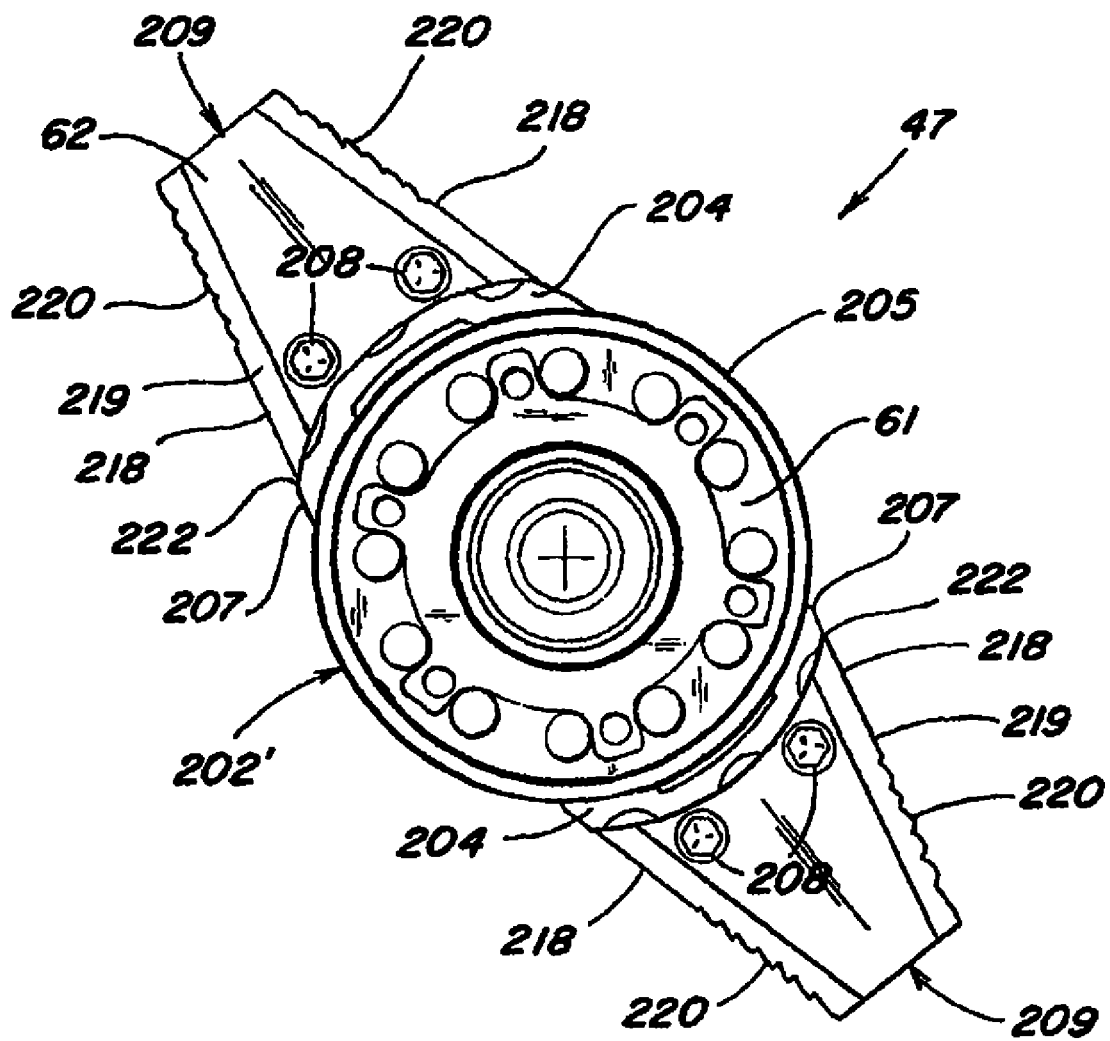
FIG. 13 is an end plan view of the rotary chopper element depicted in FIG. 6, similar in many respects to FIG. 7, but with ring portions that include only two mounting lugs therearound.

By way of illustration, and not of limitation, FIG. 13 depicts an alternate preferred rotary element embodiment that utilizes ring portions 202' that have two mounting lugs 204 positioned annularly around each ring portion, approximately 180° apart, instead of three mounting lugs spaced approximately 120° apart. The alternate knife blade array realized with the utilization of such ring portions 202' is sometimes referred to as a 2×3 array. Such 2×3 array results in a less dense knife blade arrangement on the rotary member 61, thus allowing easier access to the mounting lugs and easier setup and installation of knife blades 62 on the rotary member 61, though perhaps with some trade-off relative to the effectiveness of the resulting rotary assembly in transporting the residue rearwardly.

Obverse trade-offs may apply if greater numbers of mounting lugs are disposed around ring portions of the rotary member 61. The particular designs of the mounting lugs and knife blades may influence the extent to which such trade-offs may impact overall performance and maintenance of the integral chopper assembly.

From previous discussions hereinabove, it should be appreciated that, when the counter knife assembly 60 is in an engaged position, with the knife elements 78 thereof projecting between slots 68 of the grate portion 66 of chopper grate assembly 48, with rotary member 61 being rotated at about 3000 RPM, the knife blades 62 on the rotary member 61 will thus serve to transport residue contacted thereby rapidly towards the rear of combine 10 and, while doing so, will also interact with the knife elements 78 of the counter knife assembly 60 to chop or cut the residue into smaller pieces. Alternatively, especially if the counter knife assembly is positioned in its retracted position, with the knife elements 78 thereof being retracted within slots 68 of the grate portion 66 of chopper grate assembly 48, with rotary member 61 being rotated at a lesser rate of about 800 RPM, the knife blades 62 on the rotary member 61 will likewise serve to transport residue contacted thereby towards the rear of combine 20, but more slowly and with less damage to the crop residue, as a consequence of which longer and larger pieces of residue will be transported rearwardly in combine 20.

Other features of the integral chopper assembly 46 presented herein act or operate in conjunction with the rotary chopper element 47 that has been addressed, in significant detail, hereinabove to improve the overall effectiveness of such integral chopper assembly 46 and the operation of such rotary chopper element 47 as a part thereof. For the purpose of providing a better and/or more complete understanding of the present invention as it operates in such integral chopper assembly 46, several of such features and their operations are therefore further described hereinafter.

As has been noted previously, especially when the integral chopper assembly 46 is operated to effect a finer chop of the residue, there exists a possibility that a rock or other more solid object in the residue flow may impact a knife blade 62 or knife element 78 as the residue passes between the rotary element 47 and the chopper grate assembly 48. In general, the possibility of resulting damage to the knife blades 62 and knife elements 78, including the breaking off of such a knife blade or knife element, may be somewhat greater for the knife elements 78 due to their rather stationary position as opposed to the knife blades 62 that are being rotated in the direction of flow of the crop residue.

With prior art flail-type beaters and choppers, some insurance against catastrophic failure has been available in the form of the rotating beater elements that could pivot rearwardly as they passed a foreign object captured by stationary knife assemblies. With the improved chopper assembly 46 discussed hereinabove, in which the knife blades 62 on the rotary member 61 remain fixed, insurance against catastrophic failure has had to be otherwise developed, which development has proved challenging.

It has been found that much the same effect as with the flail-type beaters and choppers can be realized with the present integral chopper assembly 46 by permitting individual knife elements 78 in the counter knife assembly 60 to relax or retract through slots 68 in the gate portion 66 to allow a foreign object, such as an object being carried rearwardly by the rotation of the rotary member 61 and the knife blades 62, to pass through the passageway 70 and to continue rearwardly in the combine 10. In at least some respects, such action is preferable to that described for the flail-type beaters and choppers since, with such flail-type systems, the foreign object may remain captured or trapped by the stationary knives thereof, whereas, with the current system, the object may be able to pass rearwardly beyond the integral chopper assembly 46.

In light thereof, and in view of the advantages that can be realized by providing a counter knife assembly 60 that can absorb the impact of an undesired collision or impact with a foreign object, the counter knife assembly 60 of the preferred integral chopper assembly 46 addressed herein includes features that, in conjunction with the features of the preferred rotary chopper element 47 discussed hereinabove, including the arrangement of the knife blades 62 about the outer surface of rotary member 61, result in improved performance by the integral chopper assembly 46, including the transport of foreign objects through the integral chopper assembly 46 with minimal damage to the knife blades 62 of the rotary member 61 and the knife elements 78. The counter knife assembly 60 includes several features considered to be of some significance in providing such improved performance.

One feature permits individual knife elements 78 to relax or retract under conditions of heavy loading, such as impact with a more solid foreign object, so as to prevent significant damage to or breakage of that knife element 78. Another feature permits the knife elements 78 to be removably replacably affixed to retainment mounts of a knife bank, instead of being welded in place, so as to allow easy replacement of damaged knife elements and/or reseating of individual retracted knife elements 78. A further feature permits side-to-side adjustability of the knife bank so that a user can more easily align or center the knife elements 78 within slots 68 of the grate assembly 66 and for interengagement with the knife blades 62 of rotary member 61 as the chopper assembly 46 is operated, including in the event that replacement of knife elements 78 becomes necessary.

FIGS. 14-18 depict counter knife assemblies, and components thereof, that may be employed as the counter knife assembly 60 of FIGS. 3-4 in such a way as to better illustrate the manner in which the knife elements 78 are mounted or affixed to knife bank 76. In the preferred embodiments depicted in FIGS. 14-18, knife bank 76, which is dimensioned to extend between knife bank end plates 104 and 106 and generally the width of the grate portion 66 (FIGS. 3 and 4), includes a trough bracket 230 disposed between knife bank end plates 104 and 106, with a plurality of retainment mounts 232 spaced therein and therealong, to each of which retainment mounts 232 at least one knife element 78 may be attached. Preferably, however, as better shown in FIGS. 15 and 18, each retainment mount 232 will be capable of having two spaced, knife elements 78 mounted thereto in a side-to-side arrangement, which knife elements 78 may be of conventional designs and include spaced mounting holes 234 near the bases 236 thereof.

Figure 14:
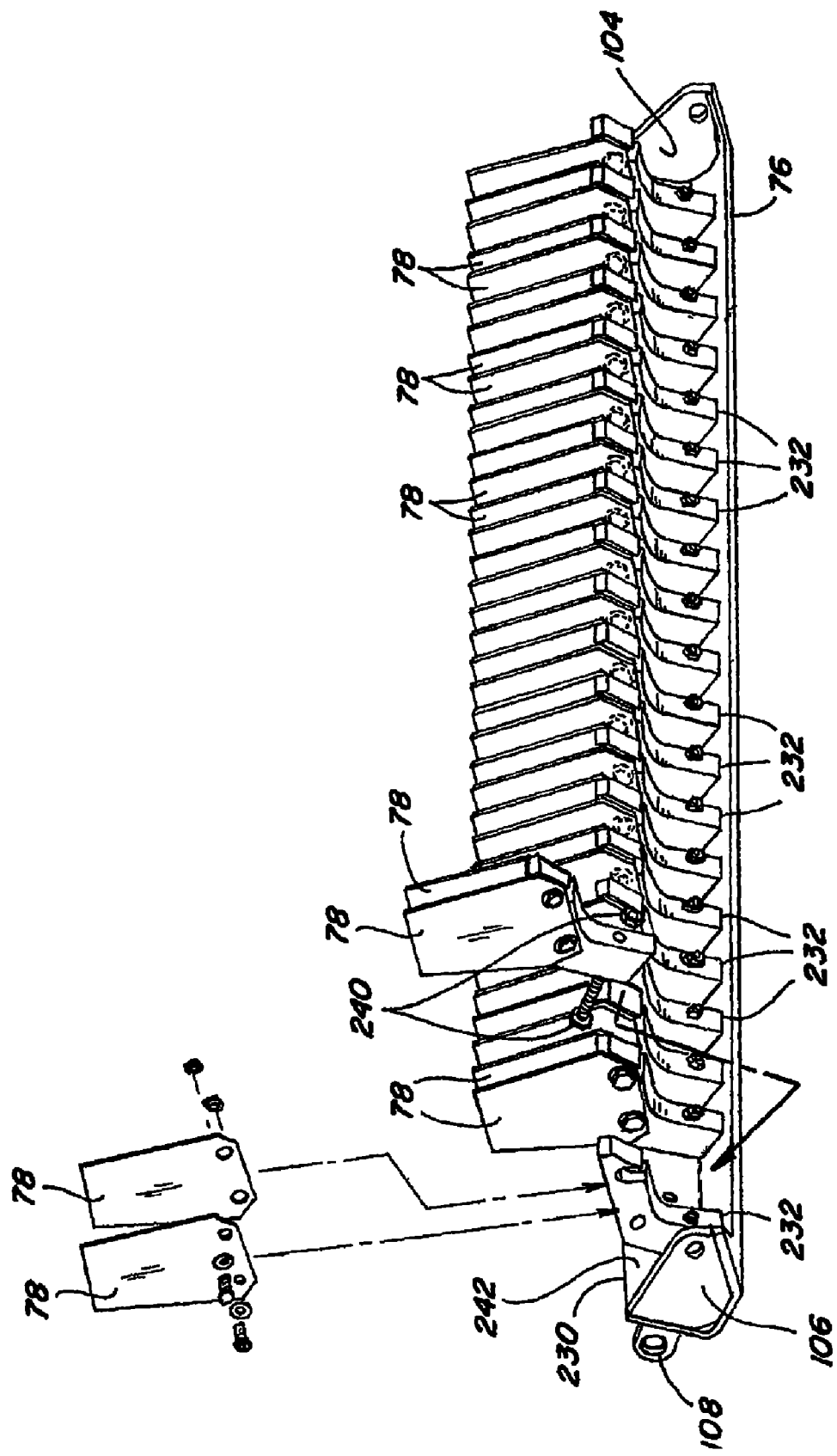
FIG. 14 is a perspective view of a preferred knife bank assembly of the chopper grate assembly of the integral chopper assembly.
Figure 15:
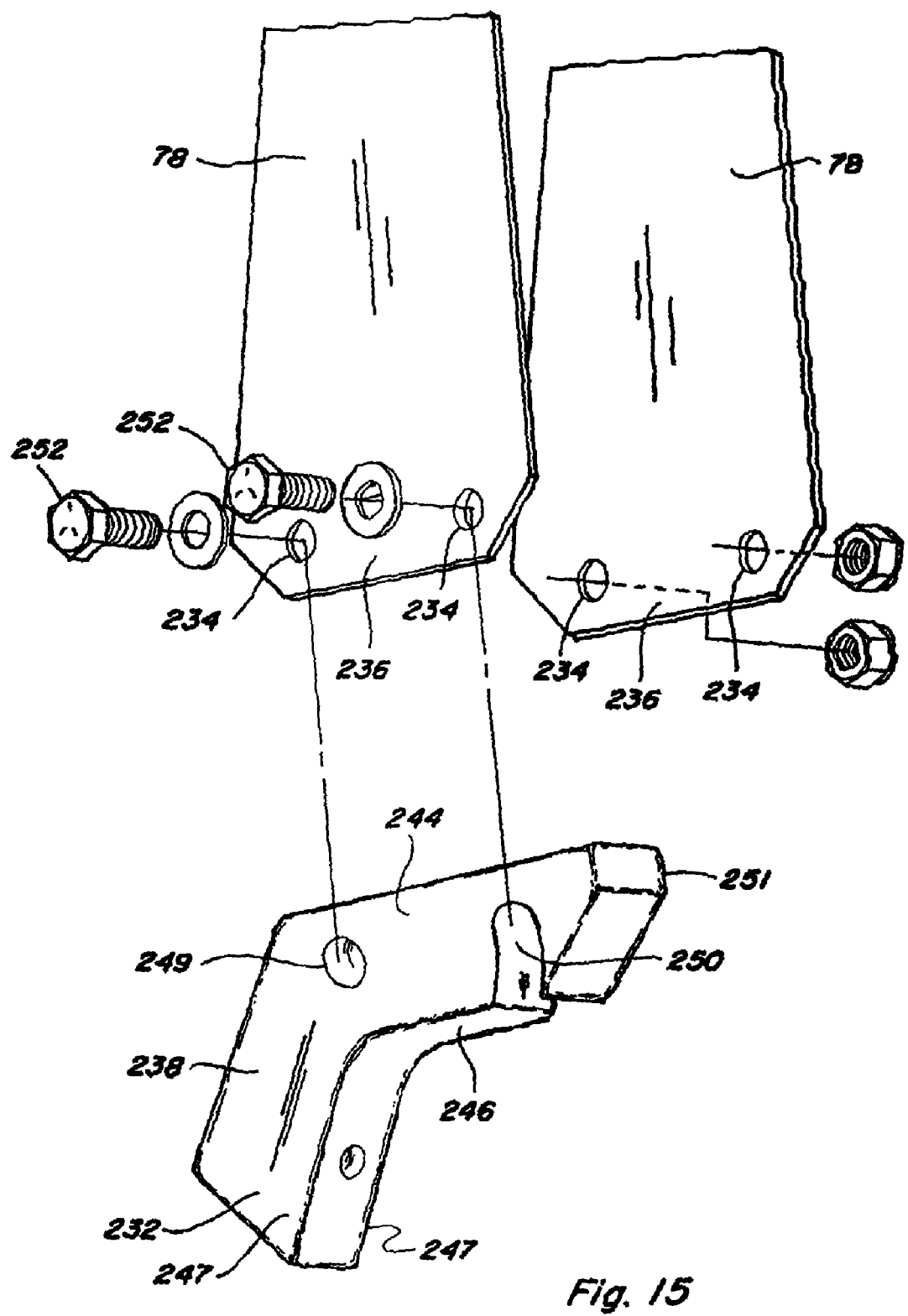
FIG. 15 is an enlarged perspective view of a retainment mount of the knife bank assembly of FIG. 14.
Figure 16:
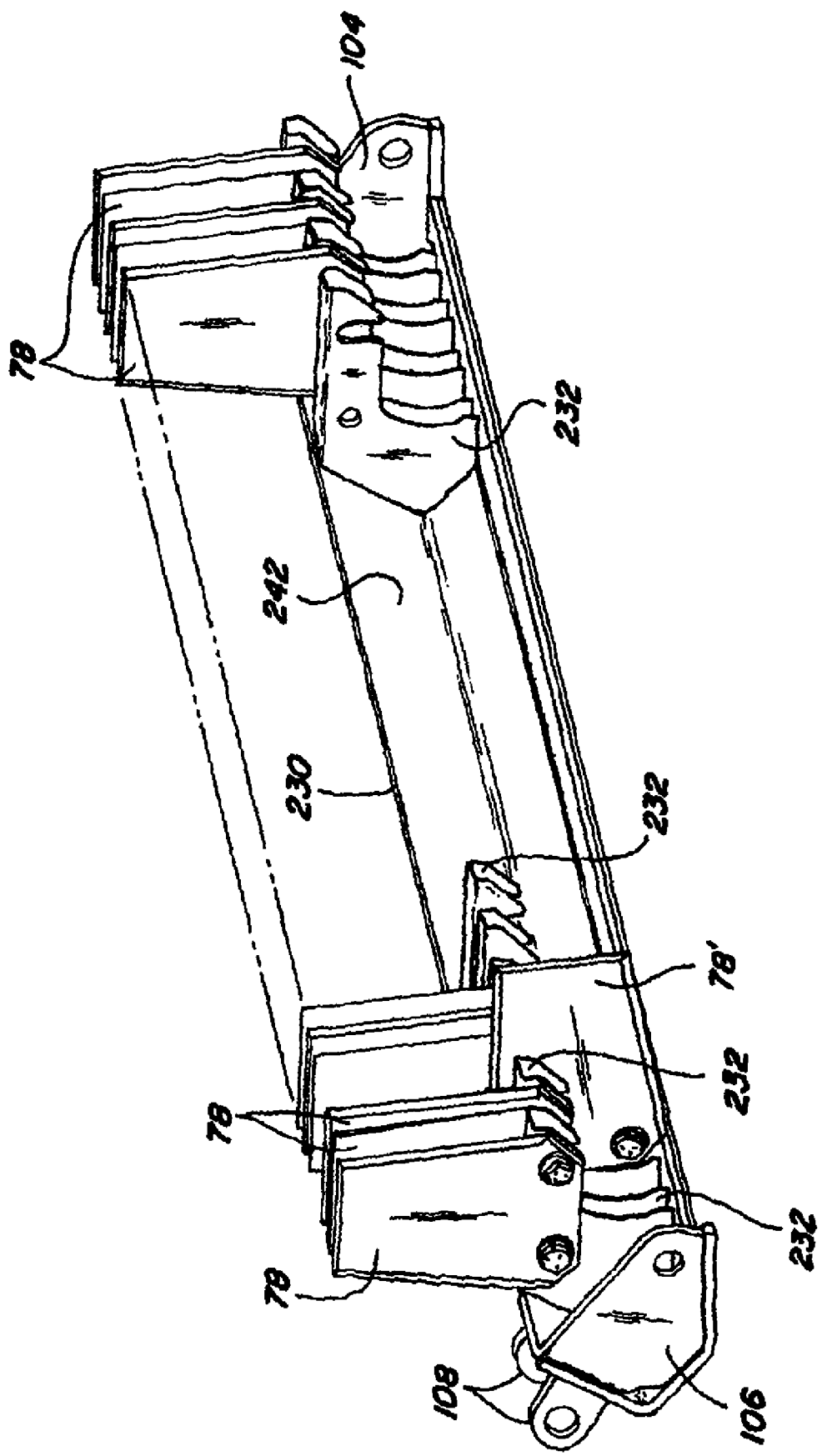
FIG. 16 is a perspective view of an alternative knife bank assembly of the chopper grate assembly of the integral chopper assembly, similar in some respects to FIG. 14, showing one of the knife elements thereof in a displaced position.
Figure 17:
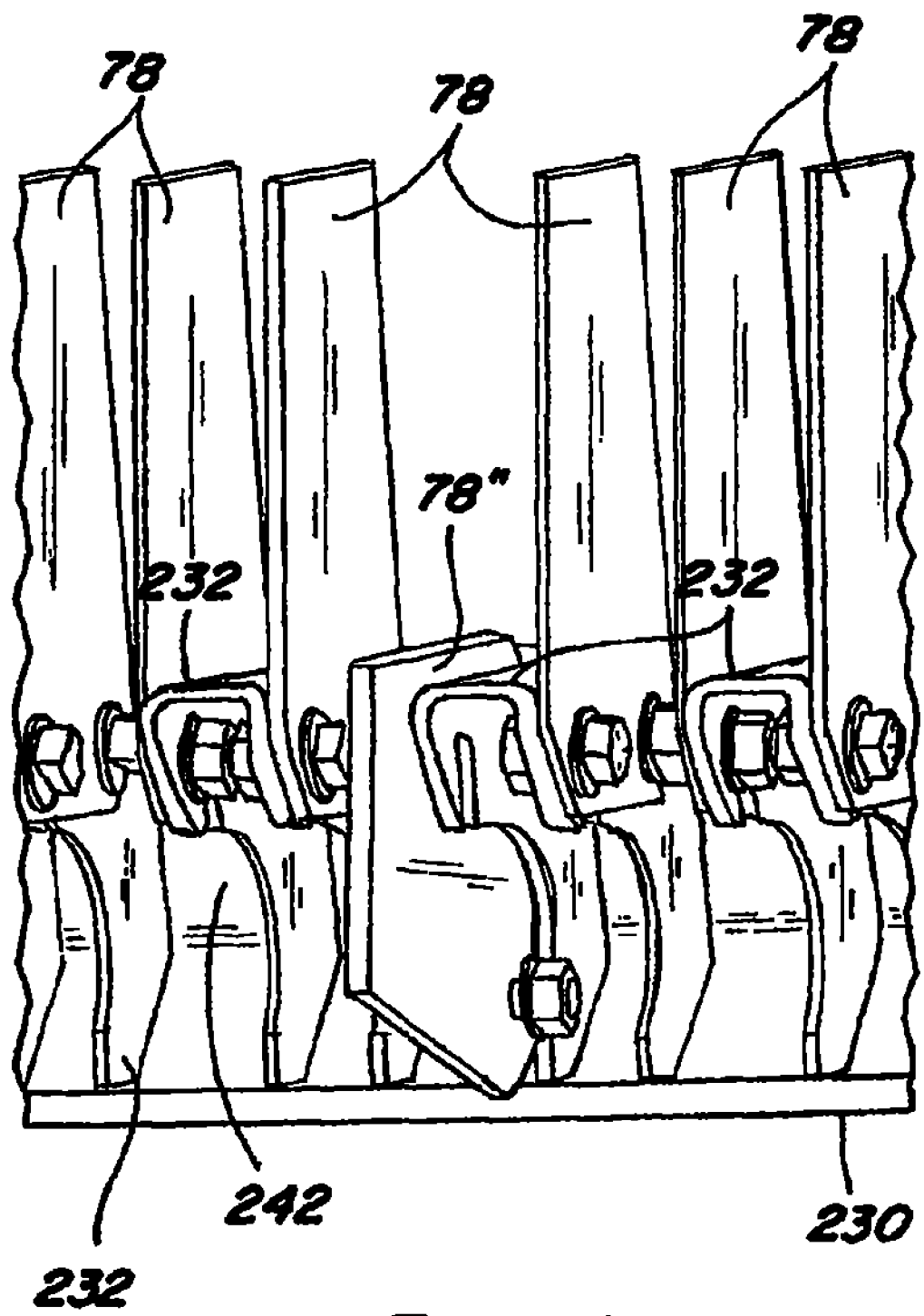
FIG. 17 is a view of a different perspective view of the alternative knife bank assembly of FIG. 16, similarly showing one of the knife elements thereof in a displaced position.
Figure 18:
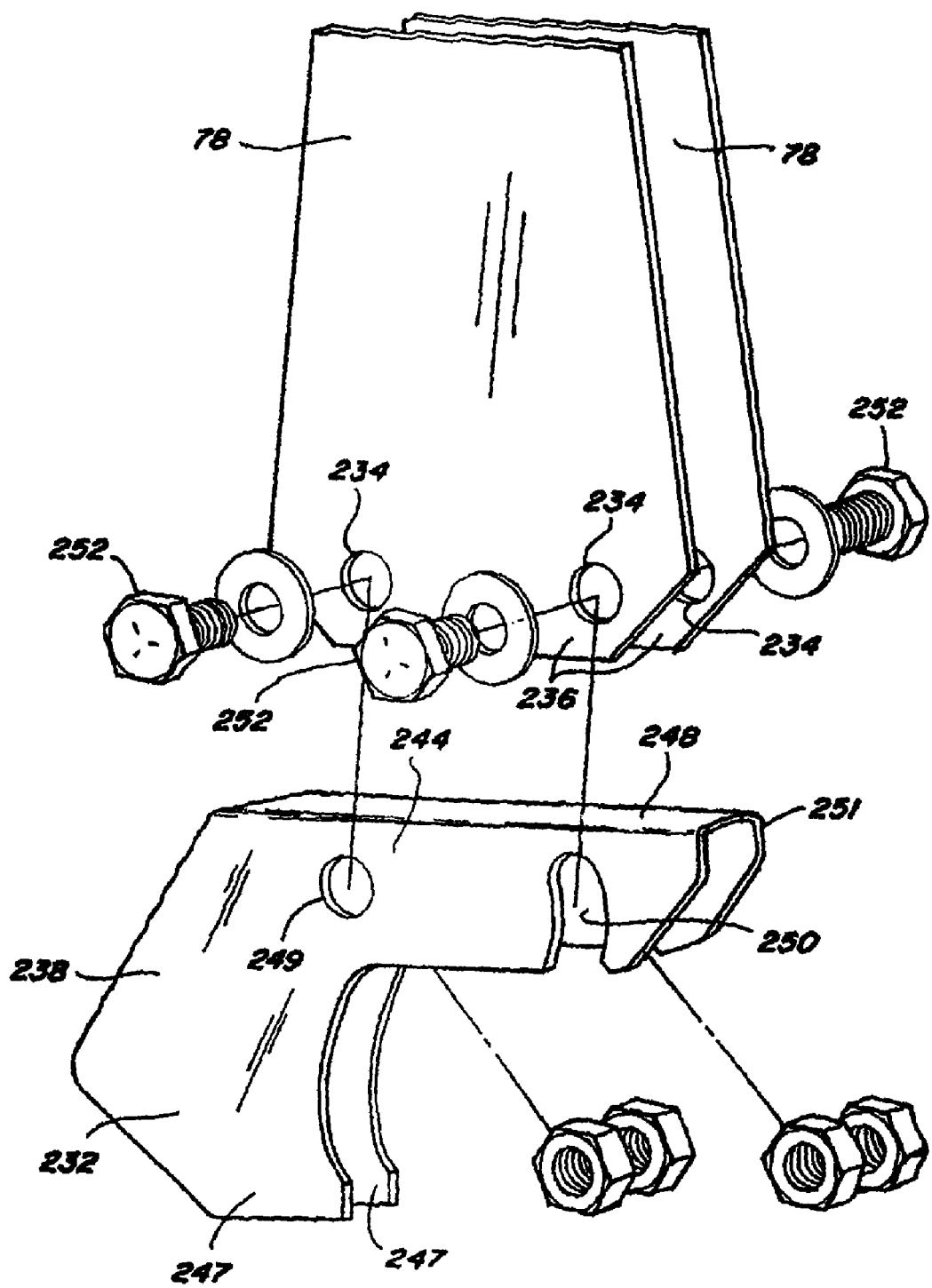
FIG. 18 is an enlarged perspective view of a retainment mount of the knife bank assembly of FIGS. 16 and 17.

Each retainment mount 232, of which two variations are shown in FIGS. 15 and 18, is preferably generally pistol-shaped with a grip portion 238 attachable, as by a nut and bolt mounting 240 in FIG. 14 or by welding in FIGS. 16 and 17, along the interior side 242 of the extended trough bracket 230, and a generally flat-sided barrel portion 244 extending outwardly from its juncture with the grip portion 238. In the variation depicted in FIG. 15, each retainment mount 232 includes a central body portion 246 between side walls 247, whereas the variation depicted in FIG. 18 includes only a central web portion 248 between side walls 247.

Along the barrel portions 244 of each retainment mount 232 are disposed a mounting hole 249 positioned closer to the grip portion 238 and a mounting slot 250 positioned closer to the distal end 251 of the barrel portion 244. Nut and bolt pairs 252 are utilized to mount the knife elements 78 to the retainment mounts 232, with a first nut and bolt pair associated with mounting hole 249 and one of the spaced mounting holes 234 of a knife element 78 and a second nut and bolt pair associated with mounting slot 250 and the other of the spaced mounting holes 234 of that knife element 78.

When the knife bank 76 is mounted and the various other components of the chopper grate assembly 60 so assembled and configured as depicted in FIG. 3, with the knife elements 78 of the knife bank 76 projecting through slots 68 of grate portion 66, crop residue will be transported through passageway 70 as the knife blades 62 of the rotary member 61 rotate past the knife elements 78 of knife bank 76 in the interengageable fashion as depicted in FIG. 6. If a rock or other foreign object impacts one or more given knife elements 78 of knife bank 76 with sufficient force to overcome the clamping force of the nut and bolt pair 252 associated with mounting slot 248, such knife element 78 may rotate about an axis formed by the nut and bolt pair 252 associated with mounting hole 246, as is shown in FIGS. 16 and 17 wherein knife elements 78' and 78'' are shown rotated to displaced or relaxed positions.

Such displaceability of individual knife elements under conditions of extreme loading helps minimize the possibility of a catastrophic failure resulting from impacts with foreign objects while allowing continued operation until such time as a user may desire to reset the displaced knife element. So long as only a minimal number of knife elements have been displaced, and if operation of the integral chopper system otherwise remains acceptable, a user may be able to delay the resetting of the displaced knife elements until a more convenient time, resulting in less down time and improving harvesting efficiency.

As between the retainment mount 232 variations depicted in FIGS. 15 and 18, the variation of FIG. 15 offers an advantage not realizable with retainment mounts that are or must be welded to the trough bracket 230 or like member in that such individual retainment mounts 232 may be individually replaced in the event of damage thereto, instead of requiring replacement of the entire trough bracket 230 or like member. Additionally, the use of such retainment mounts allows the trough brackets to be more easily built up, without the difficulties that are inherent with welding the individual mounts in place, including difficulties in effecting proper positioning and spacing of the knife elements along the trough bracket.

While such constructions are the presently preferred constructions for effecting displacement of a knife element under extreme loading conditions, it should be recognized that other embodiments for effecting like displacement could be equally as well employed, including constructions that employ shear bolts in conjunction with a second mounting hole instead of the nut and bolt pair with the mounting slot, systems that employ spring loading, either compression or tension, to hold a knife element in its extended position until loading on the knife element overcomes the spring force, or other systems that are operable to similar effect.

While the foregoing description and discussion of various features of the improved integral chopper assembly 46 of which the present invention is a part is instructive and helpful to an understanding and appreciation of the present invention and its practice, particularly as such invention is included within such integral chopper assembly 46, it must be borne in mind that such invention is but a part of such integral chopper assembly 46 and that many of the features described and discussed in some detail hereinbefore, including such features as the arrangement of the knife blades 62 around rotary member 61, the design of the mounted assemblies 209 formed by the mounting lugs 204 and knife blades 62, the retainment mounts 232 for the knife elements 78 of the knife bank 60, and the removability and replaceability thereof, as well the crossways adjustability of the trough bracket 230 along shaft member 112, are not considered critical to or to necessarily be a part of the invention of this application and its practice, which invention has been addressed only relatively briefly in the detailed description hereinabove, principally with regard to FIGS. 1-5. Accordingly, attention is now directed more specifically to the present invention and its features, including the interruption plate and the separate grate portion of the concave pan portion.

In light of the foregoing discussion, it should be apparent that, with the constructions described and discussed hereinabove, the preferred integral chopper assembly 46 is operable to transport the crop residue, including foreign objects therein, rearwardly within the combine 10 and to also chop the residue, especially when the rotary member 61 is operating near 3000 RPM and the counter knife assembly 60 is positioned with its blade elements 78 extended through slots 68 in grate portion 66 to project into the pathway 70 between the rotary element 47 and the chopper grate assembly 48. As such transport and chopping occurs, the residue is flowing along the upper surface of concave pan portion 65. By providing as part of the concave pan portion 65 an interruption plate that extends cross-wise or crossways across the concave pan portion 65 along the upper surface thereof, residue flowing along such upper surface can be briefly stalled or impeded when it encounters such interruption plate. Such flow interruption permits the residue to be chopped into shorter pieces, resulting in a lower mean length of chop (LOC) as the integral chopper assembly operates.

Figure 19:
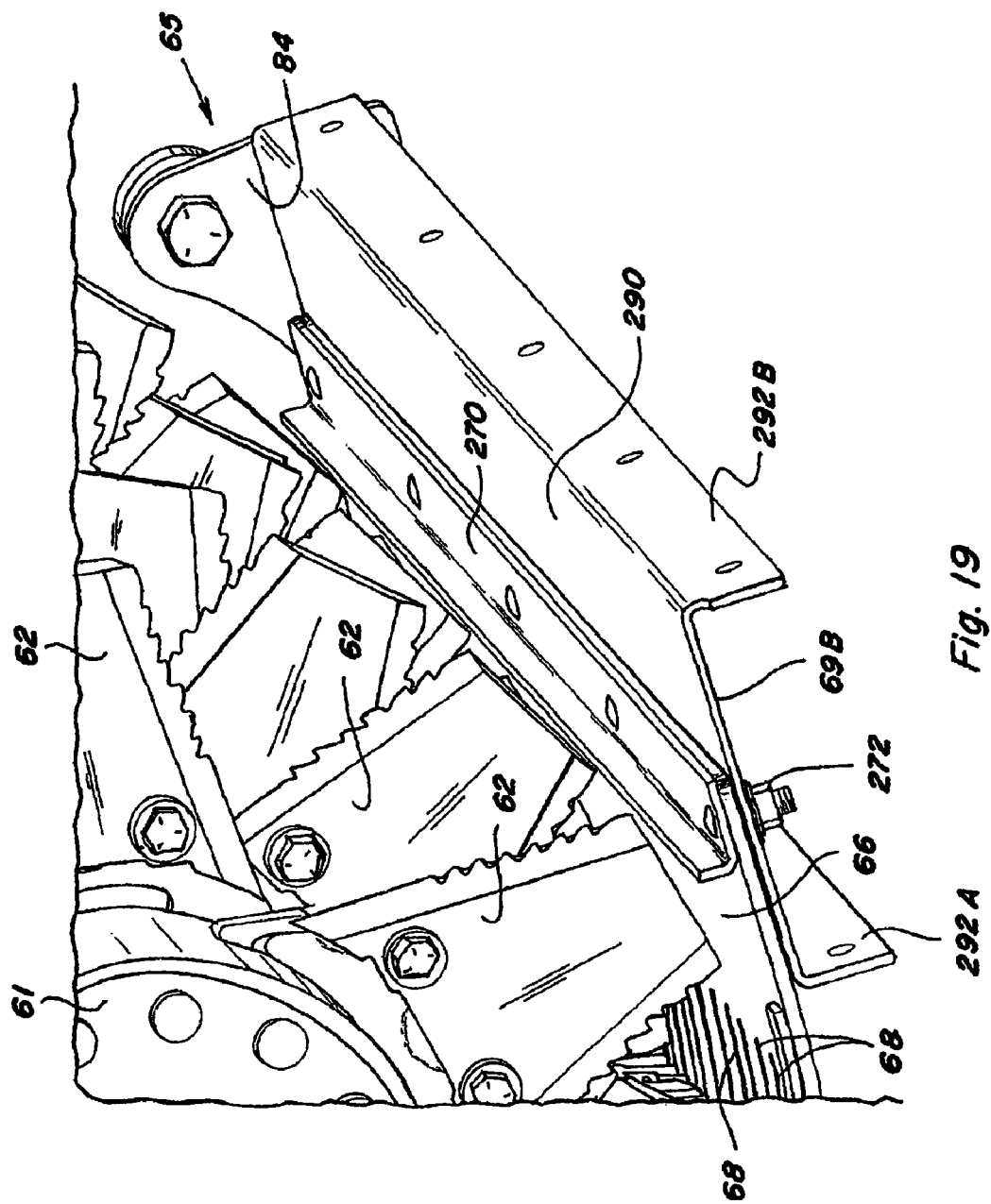
FIG. 19 is a perspective view of a portion of the chopper grate assembly, including an interruption plate installed downstream of the slots in the grate portion.

Preferably, as shown in FIG. 5, and as better shown in FIG. 19, such an interruption plate 270, which may preferably take the form of a bar of L-shaped cross-section, with its base resting upon the upper surface of the concave pan portion and its leg projecting upwardly into the passageway 70 (FIG. 4) between the rotary element 47 and concave pan portion 65, may be positioned downstream of the slots 68 through the grate portion 66, as shown in FIG. 19, by an amount to obtain the desired LOC. Interruption plate 270 is preferably operatively connected to trailing plate 69B of concave pan portion 65 by any suitable connection construction, such as the nut and bolt construction 272. While the height of the interruption plate is not considered to be critical to the design of the interruption plate, it has been found desirable, with currently available integral chopper systems, to utilize interruption plates whose heights fall within a range from about 1 mm to 25 mm. If desired, multiple interruption plates can be employed.

As has been noted hereinabove, it has also typically been the case in the past that the concave pan portion of the chopper grate assembly was so constructed, as by the welding of various components together, to be a major component of the integral chopper systems along and past which the residue would flow as it passed between the rotary element and the chopper grate assembly. It has been found that, frequently, the wear along the concave pan portion has been non-uniform, with the grate portion experiencing the greatest wear, and with the concave pan portion therefore requiring replacement as a large component whenever the wear on the grate portion became undesirable. Such replacement of the concave pan portion, because of the size of such major component, has been cumbersome and more difficult than might otherwise have been desirable, especially when the remainder of the concave pan portion, other than the grate portion, remained generally serviceable.

Figure 20:
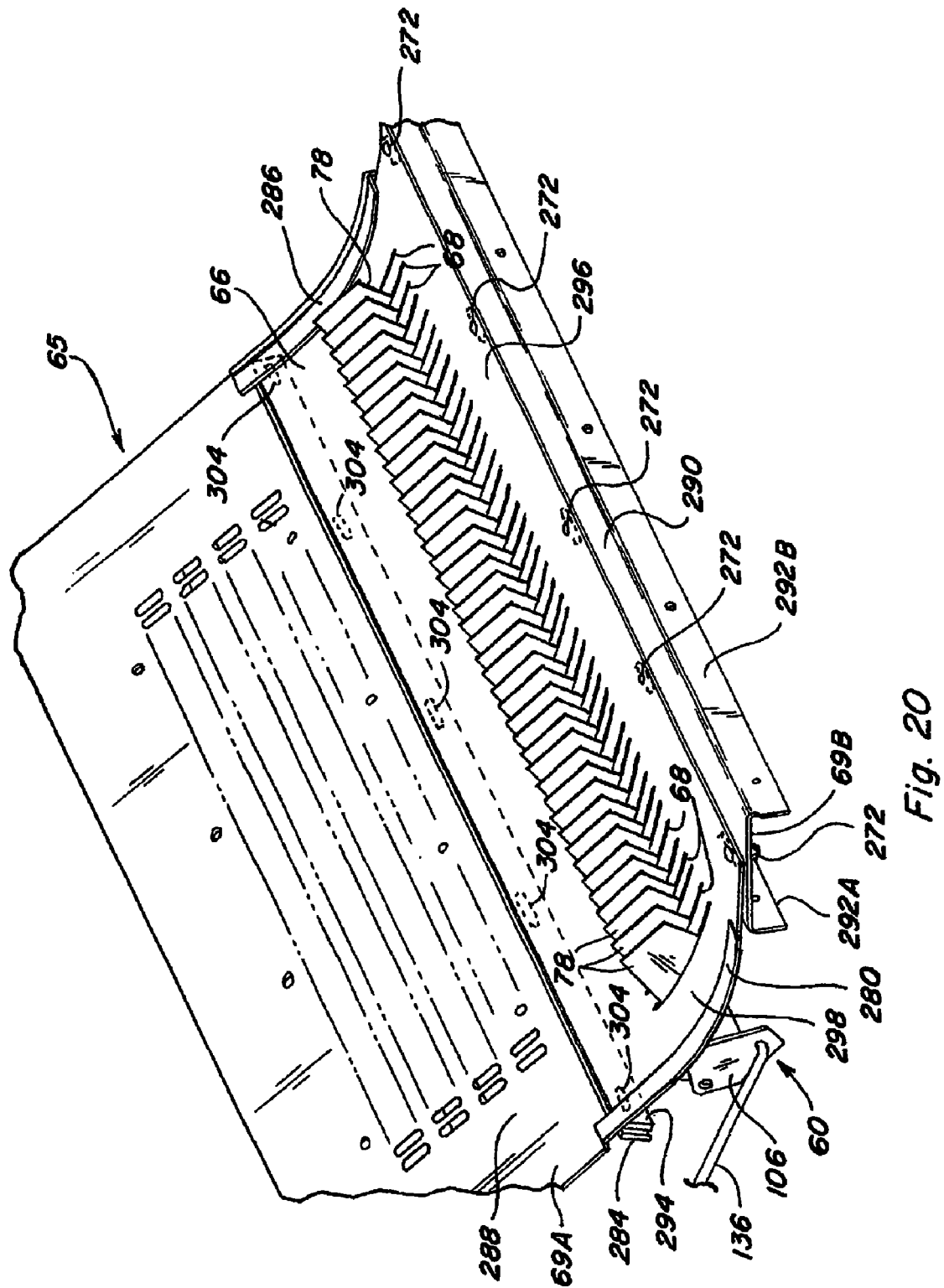
FIG. 20 is a perspective view of a portion of the chopper grate assembly better illustrating the side-to-side adjustability of the grate portion thereof.
Figure 21:
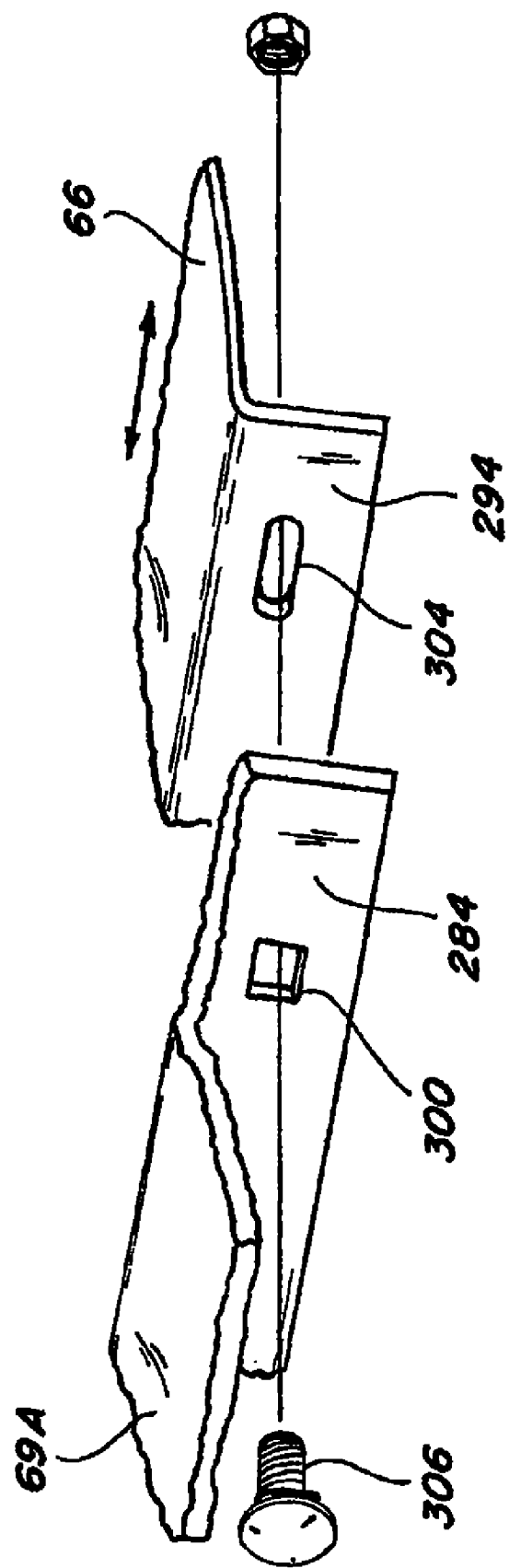
FIG. 21 is an enlarged perspective view of a portion of the chopper grate assembly of FIG. 20 better illustrating connection features between certain elements thereof.

As may be observed from FIG. 5, in the present preferred construction of integral chopper assembly 46, grate portion 66 is provided as a separate element that can be easily mated, as better depicted in FIGS. 20-21, with leading and trailing plate portions 69A and 69B of concave pan portion 65, as a consequence of which grate portion 66 can be easily removed if and when it becomes undesirably worn and replaced with a like element. As may be further observed from FIG. 5, concave pan portion 65 includes a shell portion 280 that includes the leading and trailing plate portions 69A and 69B installed between opposed concave pan side walls or plates 84 and 86, with an intermediate opening 282 between the leading and trailing plate portions 69A and 69B, into which intermediate opening 282 grate portion 66 may be inserted and installed.

As better shown in FIG. 20, in which the concave pan side plates 84 and 86 are not shown for purposes of clarity, leading plate portion 69A has a depending flange 284 along its trailing side, with guide runners 286 extending rearwardly from adjacent the upper surface 288 of such leading plate portion 69A along the concave pan side plates 84 and 86 (shown in FIG. 5) towards the trailing plate portion 69B, which is shown in FIG. 20 as having a channel shape with an upper web portion 290 extending between leading and trailing side portions 292A and 292B thereof.

Grate portion 66 is sized to fit between concave pan side plates 84 and 86, with a depending flange 294 at its leading side and an extending flap overlay 296 at its trailing side. Flap overlay 296 is insertable from below the concave pan shell portion 280 (better shown in FIG. 5) to position flap overlay 296 in an overlapping engagement (as shown in FIG. 20) with the web portion 290 of trailing plate portion 69B and to position the leading depending flange 294 of grate portion 66 in matable engagement with the depending flange 284 of leading plate portion 69A, with the upper surface 298 of grate portion 66 adjacent to the bottom sides of guide runners 286. The grate portion 66 may be connected to the leading and trailing plate portions 69A and 69B by any suitable connection constructions.

Preferably, however, the grate portion 66 will be so sized to permit some side-to-side, or crossways, adjustability thereof within the intermediate opening 282 between the leading and trailing plate portions 69A and 69B of the concave pan portion 65, and the connection constructions associated therewith will have sufficient play therewith or therein to permit such adjustability. In the preferred embodiment depicted in FIGS. 20-21, the depending flanges 284 and 294 on the leading plate portion 69A and the grate portion 66 have holes 300 and/or slots 304 therein which are generally registrable with one another and with which nut and bolt connections 306 can be utilized to connect such depending flanges to one another. Similarly, flap overlay 296 of grate portion 66 and web portion 290 of trailing plate portion 69B may have holes and/or slots therein which are generally registrable with one another and with which nut and bolt connections can be utilized to connect such flap overlay to such web portion. By slightly oversizing some or all of such holes or slots relative to the bolts that may be inserted therethrough, the desired degree of side-to-side adjustability of the grate portion 66 can be provided.

Such adjustability allows users to greatly minimize problems associated with the proper installation and alignment of the rotary assembly with the chopper grate assembly. In the past, rotary chopper elements were typically installed first, followed by installation of the chopper grate assemblies. With the grate portions of such chopper grate assemblies welded in place as part of the concave pan portion, difficulties could ensue not only in aligning the knife elements of the counter knife assemblies with the slots of the grate portions, but also, once such alignment had been accomplished, in ensuring the interengagement of the knife blades of the rotary member with the projecting knife elements of the counter knife assembly so that the knife blades could rotate past the knife elements without coming in contact therewith. Frequently, such alignment activities would, once alignment of the knife elements with the slots had been accomplished, entail side-to-side jockeying of the already previously positioned rotary chopper element to effect a non-contacting interengagement between the knife blades and the knife elements. Such alignment activities were both time consuming and frustrating to users.

Due to the relatively easy replacability of the grate portion 66 in the concave pan shell portion 280 of the present construction and the side-to-side adjustability of such grate portion 66, alignment activities have been greatly simplified. Once the knife elements 78 are installed on the retainment mounts 232, such knife elements can be relatively easily aligned with the slots in grate portion 66 by sliding the trough bracket 230 along shaft member 112. With the knife element 78 projecting through slots 68 of grate portion 66, the grate portion 66 may be adjusted side-to-side between concave pan side plates 84 and 86 to align knife elements 78 with knife blades 62 to avoid contact therebetween, all without requiring any repositioning or jockeying of the rotary chopper element 47. If the adjustment mechanism 101 of the counter knife assembly 60 is so designed that it will allow the retraction of knife elements 78 within slots 68 so that the tops of such knife elements 78 are approximately flush with the upper surface of the grate portion, but not totally withdrawn from such slots 68, such knife elements 78 will generally remain in alignment with and be self aligning with such slots 68 due to the ability of the trough bracket 230 to slide along shaft member 112.

Other or additional features of the integral chopper assembly 46 presented herein, some of which features have been addressed in some detail hereinabove, may also act or operate in conjunction with the interruption plate 270 and the separate grate portion 66 that have now been addressed, in significant detail hereinabove, to improve the overall effectiveness of such integral chopper assembly 46. For the purpose of providing a better and/or more complete understanding of the integral chopper assembly of which the present invention is a part, and the operation of such integral chopper assembly 46, information is also provided herebelow regarding a further, optional, feature of such integral chopper assembly.

Figure 22:
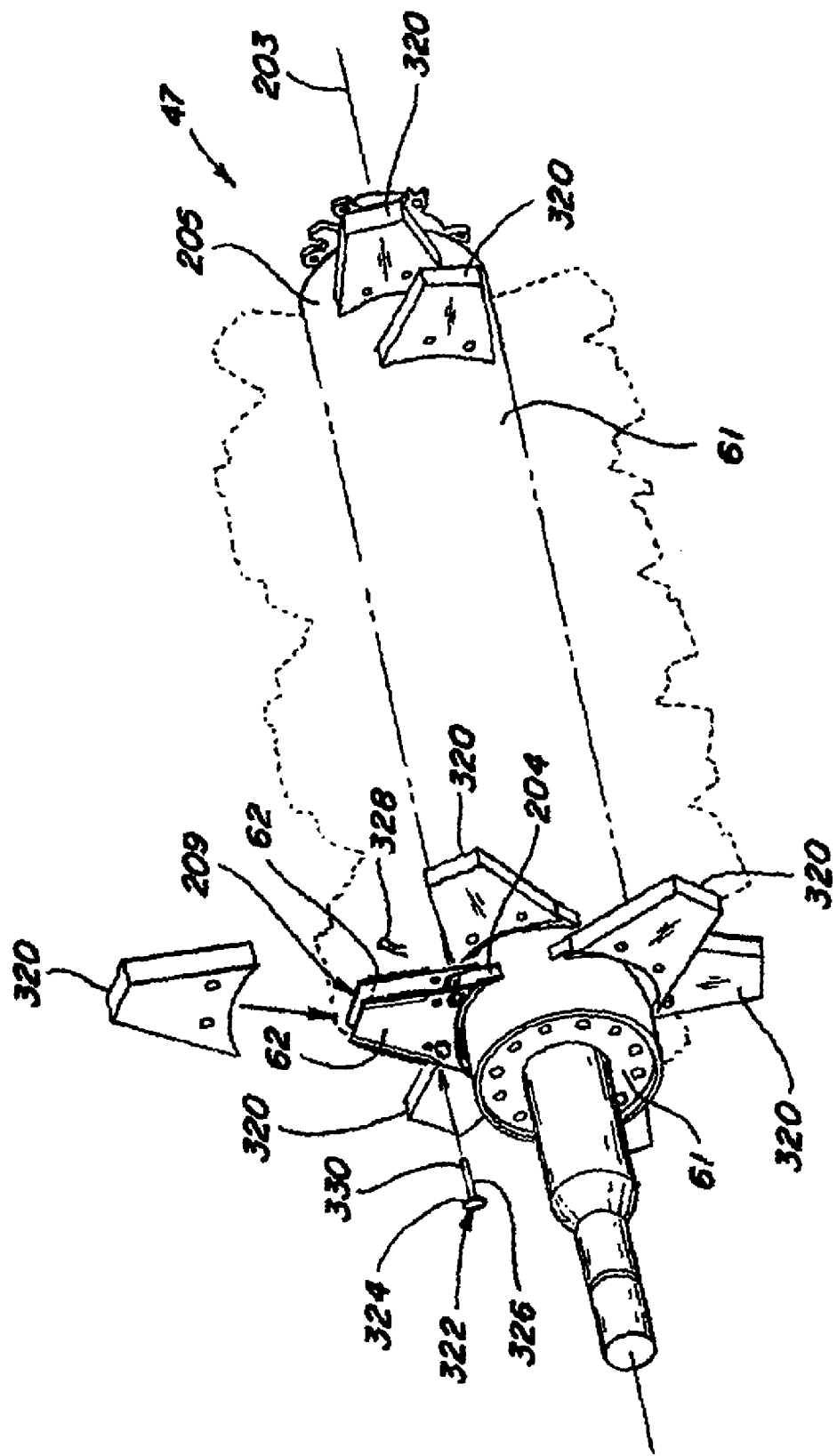
FIG. 22 is a perspective view of a rotary chopper element such as the rotary chopper element in FIG. 2, but wherein the mounted assemblies thereon are covered by optional blade covers mounted over the mounted assemblies to convert the integral chopper assembly to function as a beater construction.

As shown in FIG. 22, blade covers 320 may optionally be provided to be mounted over the mounted assemblies 209 that are disposed on the rotary member 61 so as to convert the integral chopper assembly to function as a beater, as opposed to chopping, construction. Such conversion may be considered desirable in circumstances when users wish to pass the crop residue rearwardly with less damage thereto for windrowing. The covers 320, which may be formed of any suitable material, may be configured to fit over and encompass therewithin the mounted assemblies 209 and the knife blades 62 thereof (FIGS. 6-11), and may be securable in place by suitable connector constructions, such as by a clevis pin combination 322 that includes a clevis pin 324, whose shank 326 passes through registered holes in a cover 320 and a mounted assembly 209, in association with a cotter-type pin 328 that is inserted through a locking hole 330 in the clevis pin shank 326 to secure the clevis pin 324 in place.

With such a connector construction, which is but one of many connector constructions that could be employed, the covers 320 may be relatively quickly installed and removed, as desired by a user, without the need for or use of other tools. The blade covers may be configured to be complementarily engagable with the particular arrangements of knife blades mounted on the rotary member and may, for example, be formed to fit over multiple mountings when knife blade arrangements so permit, such as if and when the mounted assemblies on the rotary member 61 are distributed or arranged generally in rows along the rotary member 61. Such blade covers permit a rotary member 61 with a plurality of knife blades 62 thereon to, effectively, be converted to a rotary member that has a multitude of more blunt beater members thereon.

Such a conversion from chopping to beating for windrowing is further enhanced as the speed of the rotary member is changed from its one operating speed of around 3000 RPM to its alternate operating speed of around 800 RPM. Such change in speed results in changed characteristics for the moments of inertia of the mounted elements about the rotary member 61, which changes are more pronounced when the mounted assemblies are converted to present more blunt beater members in place of the dual knife blades.

Although the foregoing discussions have been presented with particular reference to integral chopper assemblies, it should be understood and appreciated that the present invention is not intended to be and should not be considered to be limited to use or practice in or with integral chopper systems. It should be recognized that the present invention may well also find application and be advantageously employed and practiced in various other types of chopper systems, including, by way of example only and not of limitation, hood mount chopper systems. Accordingly references in the claims which follow to chopper assemblies or chopper systems are intended to be broadly treated and not limited to integral chopper assemblies or systems.

In light of all the foregoing, it should thus be apparent to those skilled in the art that there has been shown and described an improved integral chopper assembly that includes various features and components, including a concave pan portion that includes a replaceable grate portion and an interruption plate installable downstream from the slots in the grate portion, that function to provide the advantages sought therefor. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the integral chopper assembly and of the invention that forms a part thereof, it should further be understood that concepts of the invention, as based upon the foregoing description and discussion, may be readily incorporated into or employed in other embodiments and constructions without departing from the scope of the invention.

As seen in FIG. 21, the feederhouse 1021 of the present embodiment is located about the front or fore end of the twin rotor combine 20 having a pair of front wheels 1008 (only one shown) and a pair of rear wheels 1009 (only one shown) for providing movement over the ground. At the front of the combine 20 is a header 1012 for cutting a crop. As the combine 20 and header 1012 are moved forward, the header 1012 cuts the grain and stalk. The header 1012 moves the grain into an auger trough 1014. A transverse auger 1015 pushes the grain and stalk in the auger trough 1014 to the center of the header. The header 1012 illustrated in FIG. 1 is e.g., a wheat or similar small grain header. The header 1012 may be positioned and re-positioned relative to the ground. The header 1012 may also be tilted to the left or right or may be positioned relatively high or low to the ground. These features are constantly being adjusted depending on the terrain and crop conditions. The header reel 1013 may also be positioned relative to the header 1012. The position and rotation of the header reel 1013, again depends on the terrain and crop conditions. Moveable headers and header reels are well known and established in the art. Located at the center of the header is the feederhouse 1021 or elevator. The feederhouse 1021 moves the grain and stalks rearward into the threshing 22, separation 1004 and cleaning systems of the combine 20. After processing and separation, the processed grain is stored in a grain tank 1005 located near the top of the combine 20. The grain is removed from the grain tank 1005 by an unloading auger (not shown) through the grain tank unload tube 1006. Usually during the harvesting operations, the unloading auger remains off and the grain tank unload tube 1006 remains positioned by the grain tank 1005. However, the combine 20 can be unloaded "on the go". A separate vehicle such as a truck or tractor-pulled grain cart follows the operator. The processed grain is discharged while the combine 20 and separate vehicles are moving. After sufficient grain has been accumulated in the grain tank 1005, the operator activates the unload tube 1006. The operator 1011 then positions the end of the unload tube 1006 over a receptacle. Unloading augers and unload auger grain tubes are well known and established in the art. The trash or chaff is ejected from the rear of the combine by a chaff spreader 26. The operator 1011 controls the combine 20 from the cab 1002 located behind the header 1012 and at the front of the combine 20. From the cab 1002 the operator can observe most the various combine 20 functions. The cab 1002 usually has a large glass window or several windows which afford the operator the maximum ability to monitor the header 1012. The combine 20 and various systems are powered by an engine 1007 generally positioned at the rear of the combine 20. Most of the major systems in a combine are discussed and well known in the prior art.

Figure 23:
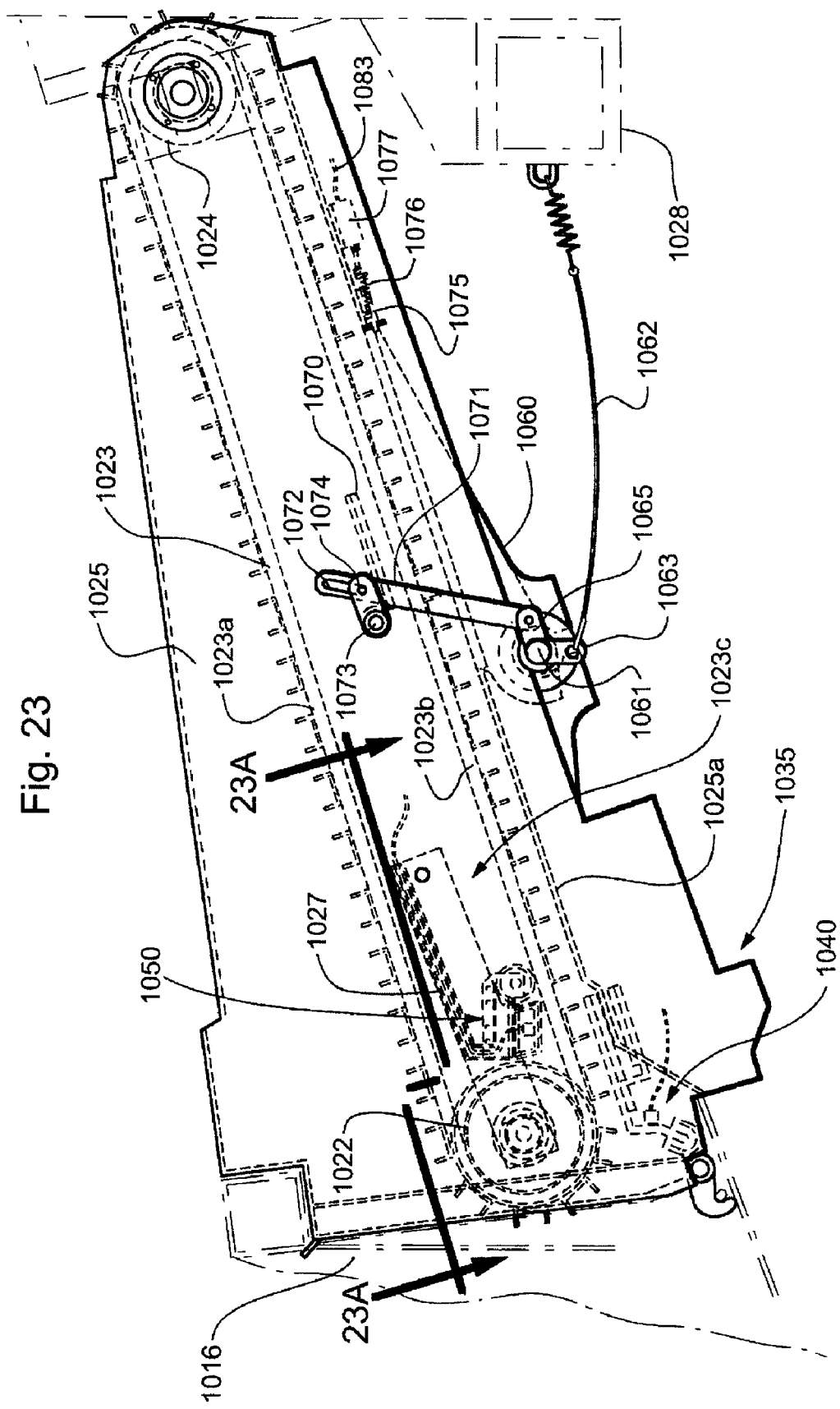
FIG. 23 is an enlarged side elevation of the feederhouse.
Figure 24:
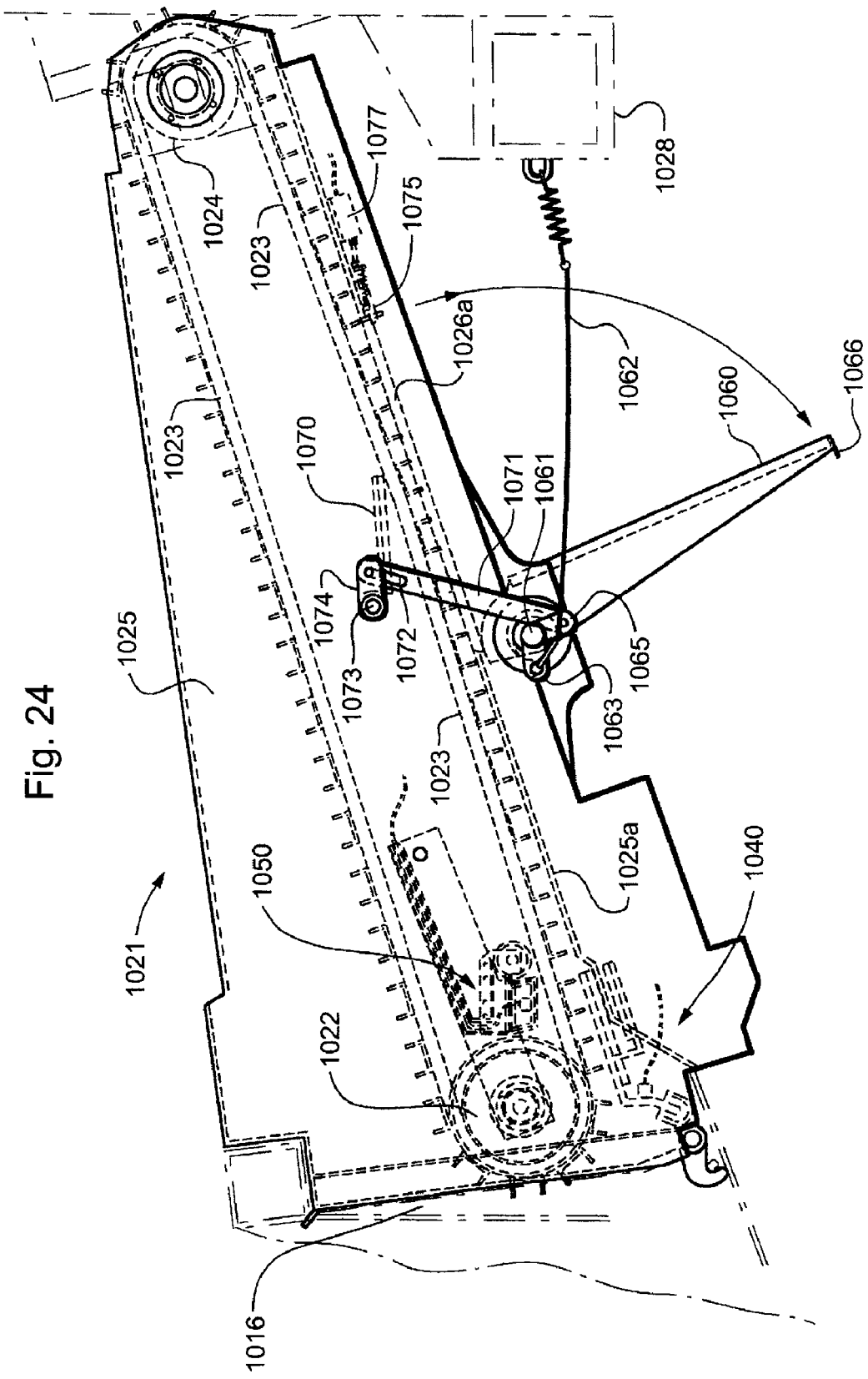
FIG. 24 is an over-all side elevation of a combine equipped with a feederhouse showing the rotational movement of the stone trap door.
Figure 25:
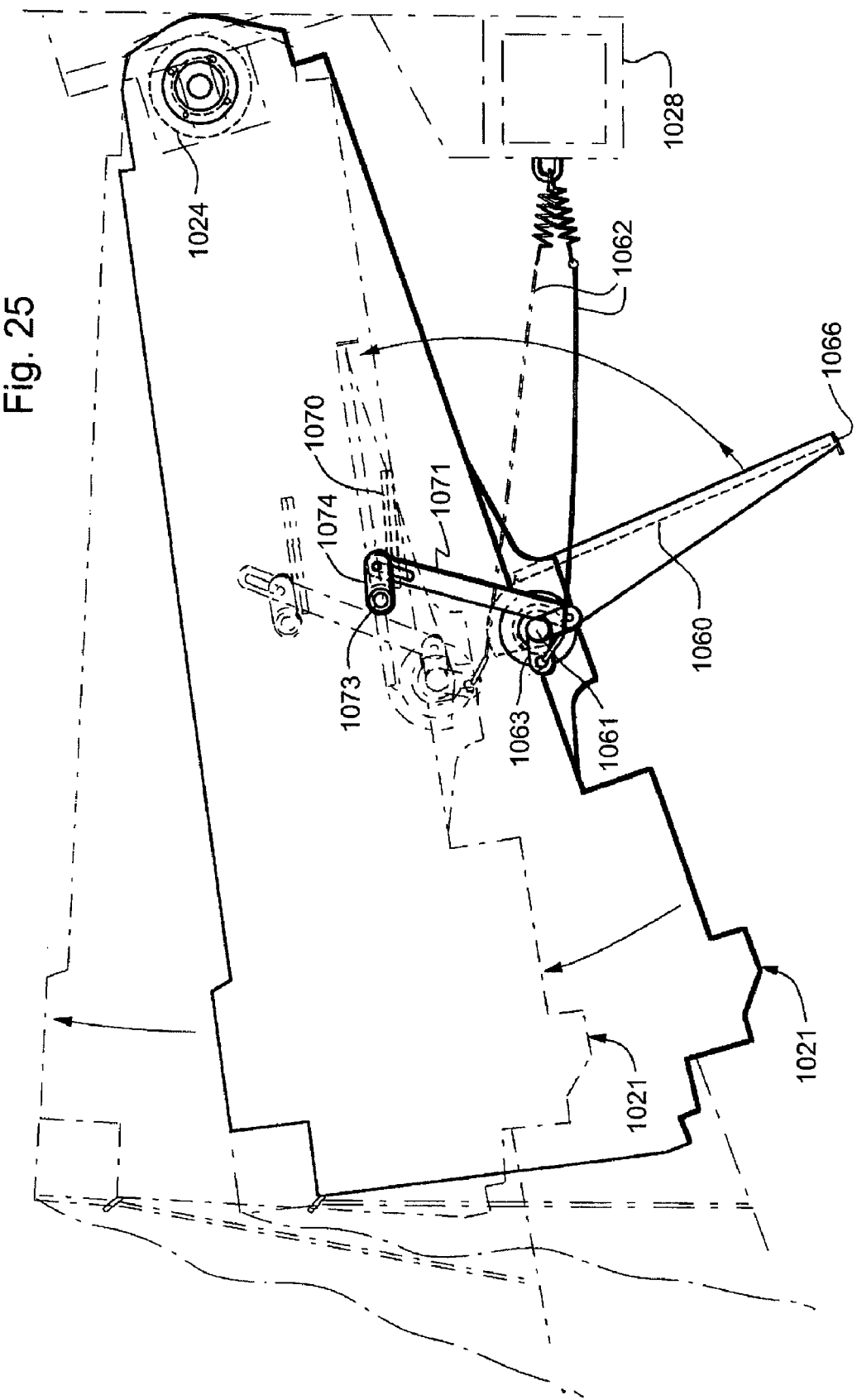
FIG. 25 is an over-all side elevation of a combine equipped with a feederhouse showing the rotational movement of the feederhouse where the door cable pulls the stone trap door closed.

The acoustic stone detector for a combine harvester feederhouse 1021 may generally be observed in FIG. 1 and more specifically in FIGS. 23 through 28. As seen in FIG. 23, there is a first acoustic element 1040 and second acoustic element 1050 located proximate to the front drum 1022 of the feederhouse 1021. These acoustic elements 1040 and 1050 transmit a signal that triggers a solenoid 1077. The solenoid 1077 opens a latch 1075 allowing the stone trap door 1060 to fall open (see FIGS. 24 and 25). This allows the stone 1030 to drop out of the feederhouse 1021. The operator then raises the feederhouse 1021 (as seen in FIG. 25); the door cable 1062 pulls the stone trap door 1060 into contact with the latch 1075. While a solenoid 1077 is preferable, the actuating means can alternatively be an actuator, a hydraulic cylinder, a linear actuator, an pneumatic actuator, an electric actuator, a motor or the like. Each of these alternative actuating means can be configured to be operatively engaged with the trap door 1060. Now that the general elements of the feederhouse 1021 have been reviewed, a more specific discussion will follow.

Figure 26:
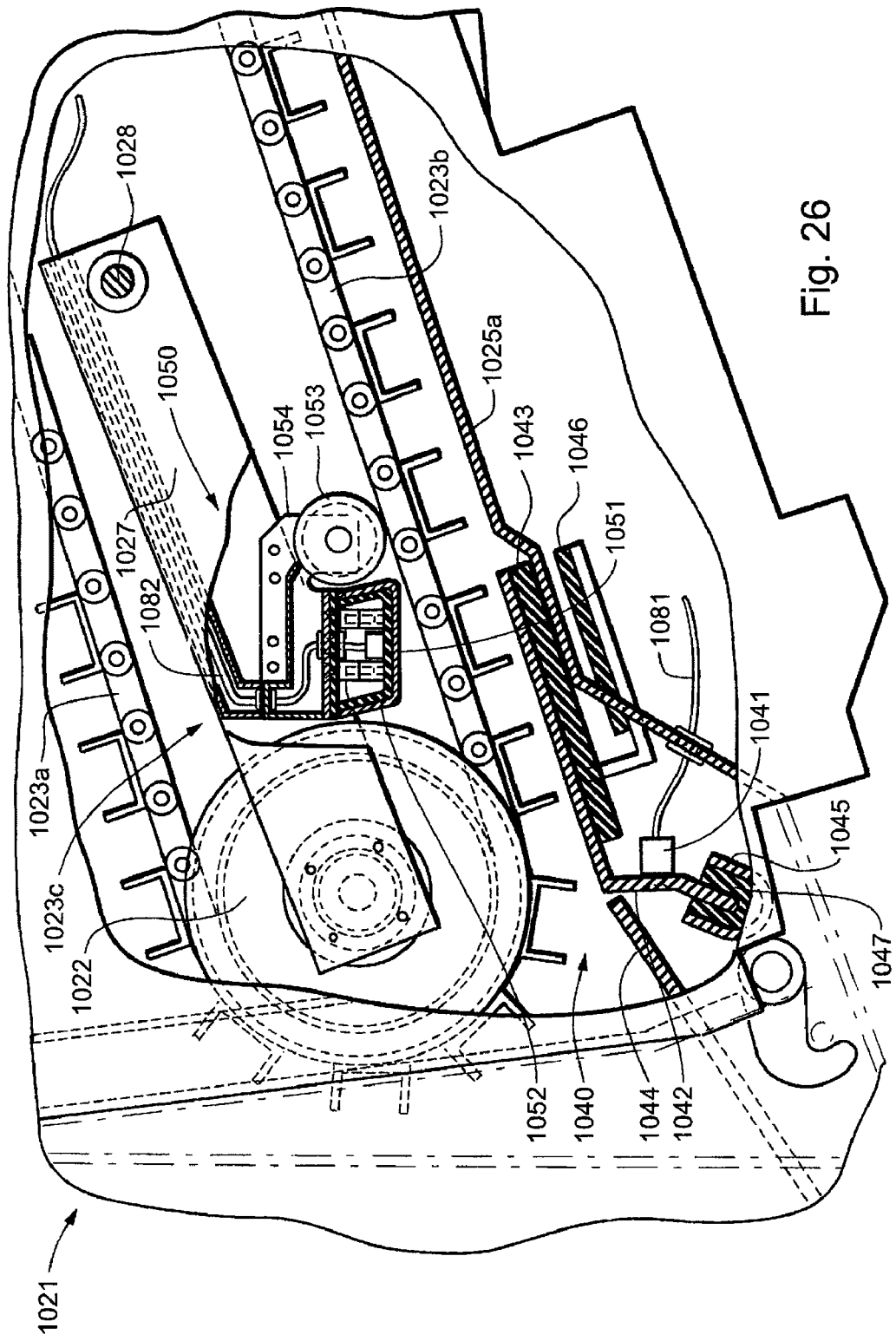
FIG. 26 is a cut-away, close-up view of the first and second acoustic elements.
Figure 27:
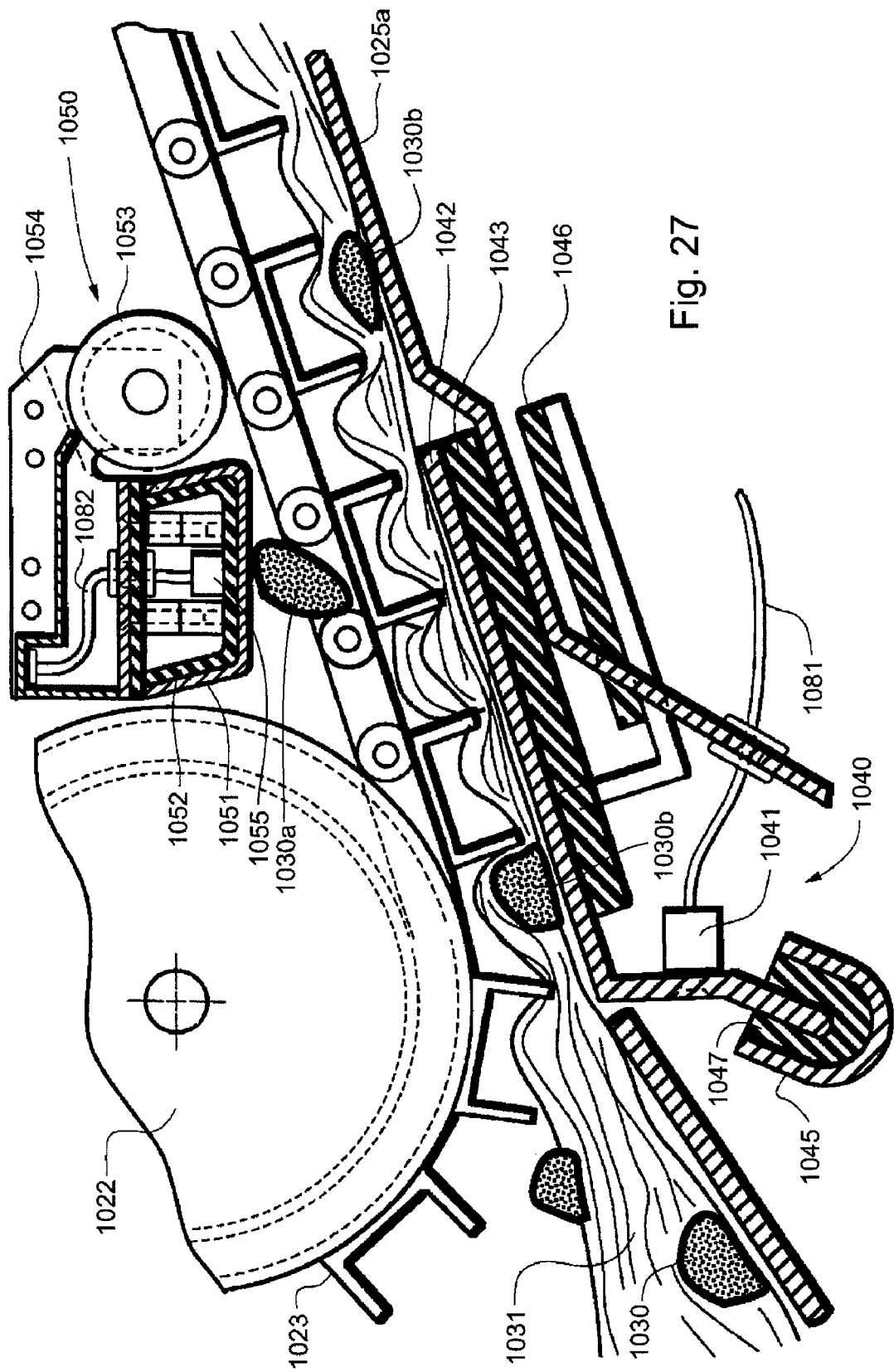
FIG. 27 is a cut-away, close-up view of the first and second acoustic elements showing a crop flow with stones passing through the feederhouse.

The first acoustic element 1040 is located beneath the front drum 1022 as seen in FIGS. 26 and 27. It consists of a first acoustic sensor 1041 monitoring the first sounding plate 1042. In the preferred embodiment, the first acoustic sensor 1041 is an accelerometer, Bosch™ sensor, model number 84058692. The acoustic sensor 1041 could also be a microphone or similar listening device. The acoustic sensor 1041 is affixed to the first sounding plate 1042. The first sounding plate 1042 extends roughly parallel to the feederhouse floor 1025*a*. The first sounding plate 1042 is positioned beneath the front drum 1022 and behind an entry plate 1044 extending from the header 1012. To prevent the sounding plate 1042 from detecting stray sounds, the plate is insulated from the remainder of the feederhouse 1021. Between the first sounding plate 1042 and the feederhouse floor 1025*a* is the first insulated plate 1043. Beneath the feederhouse floor 1025*a* is the second insulated plate 1046. The sounding plate 1042 is contoured to partially project beneath the entry plate 1044 to further minimize the sensor 1041 from receiving stray noise. A 'U' channel 1045 supports this contoured portion of the first sounding plate 1042. Again, the 'U' channel is insulated with 'U' channel insulation 1047 so as to minimize stray noise. The first acoustic sensor 1042 transmits a first sensor signal through the first sensor wire 1081. A stone 1030 impacting the first sounding plate 1042 is detected by the first acoustic sensor 1041 which sends a first signal through the first sensor wire 1081. The first acoustic sensor 1041 can detect vibrations generated by e.g., the first sounding plate 1042, for frequencies in the range from about 200 Hz to 2.0 KHz. The frequency range from about 200 Hz to 2.0 KHz represents a unique acoustic signature for stones and other dense objects compared to most crop materials. Thus, upon receiving the signal from the sensor 1041, the controller 1080 can then quality the signal to determine if it is within the range of 200 Hz to 2.0 KHz and if so, the controller 1080 can then send an output signal to either the solenoid 1077 operatively engaged with the stone trap door 1060 to open the door 1060 and/or the solenoid 400 operatively engaged with the chopper grate assembly 1046 to move the knife bank 1076 to a partially disengaged position. While FIG. 26 details only one sensor 1041, it should be understood that a series of sensors might be affixed onto the first sounding plate 1042 beneath the front drum 1022 and entry plate 1044.

Figure 23A:
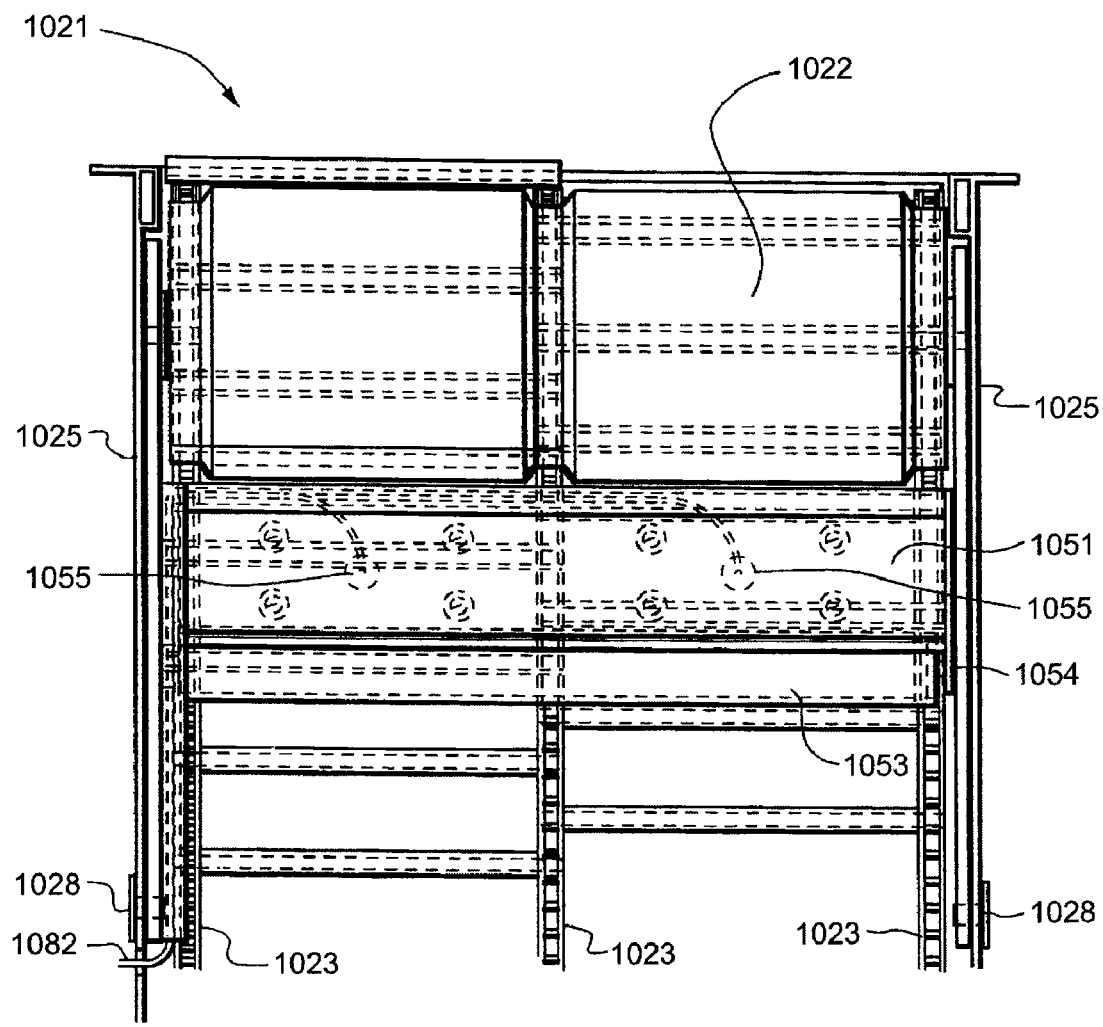
FIG. 23A is an enlarged view of the second acoustic element taken on line 2A-2A of FIG. 23.
Figure 28:
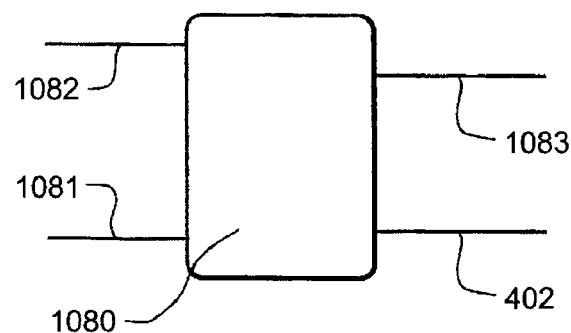
FIG. 28 is a schematic illustrating the controller and wires from the acoustic sensors and to the actuator of the feederhouse and actuator of the integral chopper assembly.

The second acoustic element 1050 is positioned in a mounting zone 1023*c*. The mounting zone 1023*c* is defined as the region between the upper apron 1023*a* and lower apron 1023*b* of the conveyor chain 1023 and behind the front drum 1022. As viewed in FIGS. 26 and 27, the second acoustic element is positioned very close to the front drum 1022. The second acoustic element 1050 has a second acoustic sensor 1055 attached to a sounding plate or channel 1051. The second acoustic sensor 1055 is identical to the first acoustic sensor 1041 and is a Bosch™ accelerometer model number 84058692. It is important that the second acoustic sensor 1055 be positioned close to the front drum 1022 and between the upper apron 1023*a* and lower apron 1023*b* as possible. In the preferred embodiment, the second acoustic sensor is positioned 195.5 mm behind the center of the front drum 1022. It is also important that the second sounding plate or channel 1051 not contact the front drum 1022 or conveyor chain 1023. To avoid the channel 1051 from receiving stray noises, there channel 1051 has channel insulation 1052. As seen in FIGS. 23A and 26, the channel 1051 is affixed on a pair of drum arms 1027. The drum arms 1027 are pivotally attached to the sidewall 1025 of the feederhouse 1021 at the drum arm pivot 1028. The front drum is rotationally attached and the opposite end of each drum arm 1027. As previously mentioned, in order to prevent the channel 1051 from receiving stray noise, it is important that the upper apron 1023*a* and lower apron 1023*b* not contact the channel 1051. In order to prevent this from occurring, a roller 1053 attached by a roller support 1054 to the channel 1051 is utilized to keep the lower apron 1023*b* from touching the channel 1051. The second acoustic sensor 1055 transmits a second sensor signal through the second sensor wire 1082. As seen in FIG. 27, a stone 1030 impacting the channel 1051 is detected by the second acoustic sensor 1055 which sends a second signal through the second sensor wire 1082. As detailed in FIG. 23A, a series of sensors may be affixed onto the channel 1051.

While the first and second acoustic sensors 1041, 1055 are preferably positioned within the feederhouse 1021, as shown in FIGS. 23, the acoustic sensors can alternatively be positioned anywhere along the length of travel of crop flow within the feederhouse 1021. Additionally, the first and second acoustic sensors 1041, 1055 can also be operatively positioned anywhere along the crop flow path upstream of the chopper assembly 46, such as the threshing system 22.

FIG. 27 illustrates a crop flow 1031 containing several stones. Stones at the bottom of the crop flow 1031 impact the first sounding plate 1042 and that impact is detected by the first acoustic sensor 1041. Stones at the top of the crop flow 1031 impact the second sounding plate or channel 1051 and that impact is detected by the second acoustic sensor 1055. A single acoustic element located beneath the front drum and lacking the modified sounding plate 1042 only detected 40-50 percent of stones 1030 entering the feederhouse 1021. However, the addition of the second acoustic element 1050 and modified first sounding plate 1042 can result in a 92-96 percent detection of the stones entering the feederhouse.

The stone trap door 1060 is pivotally attached to the feederhouse floor 1025a by a hinge 1061. When the door 1060 is closed (as seen in FIG. 23), it seals the floor aperture 1026b. The floor aperture is an opening in the feederhouse floor 1025a. When the door 1060 rotates downwards (as seen in FIG. 23), the floor aperture 1026b is opened and crop material can drop to the ground. Affixed to the hinge 1061 is the cable link 1062 and sled link 1065. Pivotally attached to the sled link 1065 is the sled linkage 1071. The sled linkage 1071 has a linkage slot 1072. Located between the upper apron 1023a and lower apron 1023b is the stone ejection sled 1070. The ejection sled 1070 is pivotally attached to the sidewall 1025 by a sled hinge 1073. Affixed to the sled hinge 1073 is the sled hinge link 1074. The opposite end of the sled hinge link 1074 is slideably attached to the sled linkage 1071 through the linkage slot 1072.

Receiving the first sensor signal through the first sensor wire 1081 is the controller 1080. The controller 1080 also receives the second sensor signal through the second sensor wire 1082. The controller 1080 than transmits a solenoid signal through the solenoid wire 1083 to the solenoid 1077. The controller 1080 can be e.g., a New Holland® controller model number CEM 86565041.

The solenoid 1077 is a push-type solenoid and in the preferred embodiment New Holland®™ solenoid model 681923 was used. The solenoid 1077 receives the solenoid signal from the controller 1081 through the solenoid wire 1083. Upon receiving this signal the solenoid 1077 retracts a spring 1076-biased latch 1075 holding the stone trap door 1060 closed. As seen in FIG. 24, after the latch is retracted, the stone trap door 1060 rotates downward allowing a portion of the crop flow containing a stone to exit through the door aperture 1026b. At the same time, the sled link rotates clockwise (as viewed in FIG. 24) pulling the sled linkage 1071 and sled hinge link 1074 downward. This rotates the sled hinge and attached stone ejection sled 1070 downwards. The sled 1070 contacts and deflects the lower apron 1023b downwards. This helps to deflect the crop flow 1031 containing a stone through the floor aperture 26b. In the preferred embodiment, the stone trap door 1060 rotates approximately 75 degrees and the stone ejection sled rotates approximately 25 degrees.

FIG. 25 illustrates how the stone trap door 1060 is closed over the floor aperture 1026b. While the door 1060 is open, the feederhouse is raised or rotated clockwise (as seen in FIG. 25) about the rear drum 1024. A door cable 1062 attached to the cable link 1062 and combine frame 1028 tightens and rotates the stone trap door 1060 counter-clockwise. The spring-biased latch 1075 is inserted through a latch catch on the door 1060. This ensures that the door remains closed, those preventing any inadvertent crop loss.

The foreign object detection and ejection system operates as follows. For example, a stone enters the header 1012 and moves with the crop flow to the feederhouse 1021. Within the feederhouse 1021 the crop flow 1031 passes between the front drum and feederhouse floor 1025a. Stone 1030b contacts the first sounding plate 1042, the channel, second sound plate 1051 or combination thereof. An acoustic sensor either 1041 and 1055 detects the impact(s) and transmits a sensor signal through the sensor wire 1081 or 1082 to the controller 1080. The controller 1080 transmits a solenoid signal through the solenoid wire 1083 to the solenoid 1077. The solenoid 1077 retracts the latch 1075 from the latch catch 66 on the stone trap door. The stone trap door swings open allowing the portion of the crop flow containing a stone to exit the feederhouse 1021 through the floor aperture 1026b. The sled link attached to the hinge 1061 pulls the sled linkage 1071 and sled hinge link 1074 downwards. The sled hinge link 1074 rotates the sled hinge 1073. The ejection sled, which is affixed to the sled hinge 1073, is rotated into contact with the lower apron 1023b. The sled 1070 deflects the lower apron 1023b and helps eject additional crop flow containing any stones. After the stone is ejected, the feederhouse is raised. A door cable 1062 pulls the stone trap door 1060 closed. The latch 1075 is re-inserted into the latch catch 1066.

The controller 1080 is operatively connected to the solenoid 1077 of the feederhouse 1021, the first acoustic sensor 1041, the second acoustic sensor 1055, and the solenoid 400 of the integral chopper assembly 1046 i.e., the knife bank solenoid. The controller 1080 is configured to receive an input signal from the first acoustic sensor 1041 and the second acoustic sensor 1055 upon the sensors 1041, 1055 detecting the presence of a foreign object. Thereafter, the controller 1080 transmits an output signal to the solenoid 1077 of the feederhouse 1021 to activate the solenoid 1077 thereby allowing the trap door 1060 to pivot to the open position. While in the open position (FIG. 24) any foreign objects, such as stones, can be dropped out. Upon receiving input signals from either of the first acoustic sensor 1041 or the second acoustic sensor 1055, the controller 1080 further activates the solenoid 400 via transmitting an output signal to the solenoid via knife bank solenoid wire 402. Upon activation of the knife bank solenoid 400, the knife bank 1076 is moved to a first position wherein the knife bank 1076 is partially engaged with the chopper grate assembly 1048. Preferably, the knife bank 1076 is moved so as to be in a fully retracted position from the grate portion 1066.

The controller 1080 can also be configured to activate the solenoid 1077 of the feederhouse 1021 and the solenoid 400 of the integral chopper assembly 1046 simultaneously upon receiving an input from the first acoustic sensor 1041 or second acoustic sensor 1055. Alternatively, the controller 1080 can be configured to activate the solenoid 1077 of the feederhouse 1021 and the solenoid 400 of the integral chopper assembly 1046 sequentially, such as with a time delay between activation of the solenoid 400 of the integral chopper assembly 1046 and activation of the activate the solenoid 1077 of the feederhouse 1021. Sequentially timing the activation of the solenoids 1077, 400 advantageously provides for the time necessary for a stone to pass through the combine 20 and reach the chopper grate assembly 1048 after being initially detected by the first acoustic sensor 1041 or second acoustic sensor 1055.

The controller 1080 can be positioned at any suitable location on the combine 20. For example, the controller 1080 can be housed within the cab 1002, as shown in FIG. 1. Controller's 1080 are well known in the art and a detailed description of them is no necessary for a complete understanding of the present invention. However, exemplary controllers can include, without limitation, a computer, a programmable logic controller, or a central processing unit and more specifically a New Holland® controller model number CEM 86565041 which can be configured to operate as controller 1080.

The controller 1080 can further provide the capability of a manual override such that the operator 1011 can activate the solenoids 1077, 400 of the feederhouse 1021 and integral chopper assembly 1046, respectively. The manual override function advantageously allows for the operator 1011 to remove foreign objects that may be undetected by the acoustic elements 1040, 1050.

The controller 1080 can also be operatively connected to the rotary chopper element 47 to control the speed of rotation of the rotary chopper element 47. In particular, the controller 1080 can be configured to reduce the speed of rotation of the rotary chopper element 47 upon the acoustic element 1040 or 1050 detecting the presence of a foreign object. This advantageously reduces the speed of any potential impact and thus damage to the chopper assembly by foreign objects while the knife bank 1076 is being retracted from the chopper assembly. Alternatively, the controller 1080 can be configured to cut off all power to the rotary chopper element 47 such that the rotary chopper element 47 ceases to be in a driven state.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A foreign object detection and removal system of a combine harvester comprising:
    a feederhouse that includes a door attached to the feederhouse, an actuator operatively engaged with the door, and at least one acoustic element positioned within an interior of the feederhouse to detect the presence of a foreign object,
    a chopper assembly that includes a chopper grate assembly including a knife bank operatively engaged with the chopper grate assembly and movable between at least a partially disengaged position and a fully engaged position, and an actuator operatively engaged with the knife bank to move the knife bank between the at least partially disengaged and the fully engaged positions; and
    a controller operatively connected to the acoustic element and the actuator operatively engaged with the door, the controller operatively connected to the actuator operatively engaged with the knife bank, and the controller configured to receive an input signal generated from the acoustic element and to activate the actuator operatively engaged with the door to open the door, the controller further configured to activate the actuator operatively engaged with the knife bank of the chopper grate assembly after a time delay from the receipt of the input signal so that a retained foreign object has time to reach the chopper grate assembly, the actuator of the chopper grate assembly activated to move the knife bank into at least the partially disengaged position to permit movement therethrough of any retained foreign object while crop continues to enter the feederhouse.

2. The foreign object detection and removal system of claim 1, wherein the chopper assembly further comprises a rotary chopper and an actuator operatively engaged with the rotary chopper to reduce a speed of rotation of the rotary chopper or to cut the power to the rotary chopper, the controller further configured to activate the actuator operatively engaged with the rotary chopper at the same time as it activates the actuator operatively engaged with the knife bank so that any retained foreign object has time to reach the rotary chopper, the actuator of the rotary chopper activated to reduce the speed of rotation of the rotary chopper.

3. The foreign object detection and removal system of claim 1, wherein the feederhouse further comprises a conveyer belt assembly and a first acoustic element of the at least one acoustic element is positioned adjacent a forward feeder drum of a conveyor belt assembly.

4. The foreign object detection and removal system of claim 1, wherein the controller is configured with a manual override function.

5. The foreign object detection and removal system of claim 1, wherein the chopper assembly is an integral chopper assembly.

6. The foreign object detection and removal system of claim 3, further comprising a second acoustic element of the at least one acoustic element which is positioned behind the forward feeder drum of the conveyor belt assembly.

7. The foreign object detection and removal system of claim 6, wherein the first acoustic element is positioned in a forward position relative to the second acoustic element, both first and second acoustic elements cooperating to provide at least one input signal when a foreign object is detected such that a majority of foreign objects which enter the feederhouse are detected.

8. A foreign object detection and removal system of a combine harvester comprising:
    a feederhouse that includes a door attached to the feederhouse, an actuator operatively engaged with the door, and at least one acoustic element positioned within an interior of the feederhouse to detect the presence of a foreign object,
    a threshing system operatively connected to the feederhouse for receiving a flow of crop material;
    a chopper assembly operatively connected to the threshing system for receiving the flow of crop material from the threshing system, the chopper assembly including a rotary chopper and an actuator operatively engaged with the rotary chopper to reduce a speed of rotation of the rotary chopper,
    a chopper grate assembly operatively connected to the threshing system for receiving the flow of crop material from the threshing system, the chopper grate assembly including a knife bank operatively engaged with the chopper grate assembly and movable between at least a partially disengaged position and a fully engaged position and an actuator operatively engaged with the knife bank to move the knife bank between the at least partially disengaged and the fully engaged positions, and
    a controller operatively connected to the acoustic element and the actuator operatively engaged with the door, the controller operatively connected to the actuator operatively engaged with the rotary chopper of the chopper assembly, and the controller operatively connected to the actuator operatively engaged with the knife bank of the chopper grate assembly, the controller configured to receive an input signal generated from the acoustic element and to activate the actuator operatively engaged with the door to open the door, the controller further configured to activate both the actuator operatively engaged with the rotary chopper of the chopper assembly and the actuator operatively engaged with the knife bank of the chopper grate assembly after a time delay from the receipt of the input signal so that a retained foreign object has time to reach the chopper assembly and the chopper grate assembly, the actuator of the rotary chopper activated to reduce the speed of rotation of the rotary chopper or to cut the power to the rotary chopper and the actuator of the chopper grate assembly activated to move the knife bank into at least the partially disengaged position to permit movement therethrough of any retained foreign object while crop continues to enter the feederhouse.

9. The foreign object detection and removal system of claim 8 wherein the feederhouse further comprises a conveyer belt assembly and a first acoustic element of the at least one acoustic element is positioned adjacent a forward feeder drum of a conveyor belt assembly.

10. The foreign object detection and removal system of claim 9, further comprising a second acoustic element of the at least one acoustic element which is positioned behind the forward feeder drum of the conveyor belt assembly.

11. The foreign object detection and removal system of claim 8, wherein the controller is configured with a manual override function.

12. The foreign object detection and removal system of claim 8, wherein the chopper assembly is an integral chopper assembly.

13. The foreign object detection and removal system of claim 10, wherein the first acoustic element is positioned in a forward position relative to the second acoustic element, both first and second acoustic elements cooperating to provide at least one input signal when a foreign object is detected such that a majority of foreign objects which enter the feederhouse are detected.

* * * * *